United States Patent [19]
Kubota

[11] Patent Number: 5,967,629
[45] Date of Patent: Oct. 19, 1999

[54] VEHICLE ANTI-LOCK BRAKING SYSTEM ADAPTED TO DETERMINE PRESSURE CONTROL MODE OF ONE OF REAR BRAKE CYLINDERS DEPENDING UPON THAT OF THE OTHER REAR BRAKE CYLINDER

[75] Inventor: Kazuhiko Kubota, Toyota, Japan

[73] Assignee: Toyota Jidosha Kabushiki Kaisha, Toyota, Japan

[21] Appl. No.: 08/837,864

[22] Filed: Apr. 29, 1997

[30] Foreign Application Priority Data

Apr. 30, 1996 [JP] Japan ................................. 8-109031

[51] Int. Cl.⁶ ....................................... B60T 8/62
[52] U.S. Cl. ..................... 303/186; 303/113.5; 303/187
[58] Field of Search ................... 303/3, 15, 20, 303/186, 187, 188, 113.5, 116.1

[56] References Cited

U.S. PATENT DOCUMENTS 5,538,334  7/1996  Kushi et al. ...................... 303/113.5

FOREIGN PATENT DOCUMENTS 3-42769 U  4/1991  Japan .
7-251727  10/1995  Japan .

Primary Examiner—Robert J. Oberleitner
Assistant Examiner—Mariano Sy
Attorney, Agent, or Firm—Kenyon & Kenyon

[57] ABSTRACT

Anti-lock brake system including a controller for controlling at least one solenoid-operated valve device for controlling braking pressures in a rear right and a rear left brake cylinder such that if two different control modes which would be selected for the rear brake cylinders independently of each other include pressure decrease mode, this pressure decrease mode is determined as effective control mode for one of the rear brake cylinders, while one of control modes which is not selected for the other rear brake cylinder and which causes lower braking pressure in the other rear brake cylinder than when the normally selected mode is determined as the effective control mode is determined as the effective control mode for that other rear brake cylinder, and wherein the normally selected different control modes are determined as the effective control modes for the rear brake cylinders if the normally selected control modes consist of pressure hold mode selected for one of the rear brake cylinders and pressure increase mode selected for the other rear brake cylinder.

9 Claims, 9 Drawing Sheets

| No. | FIRST SHUT-OFF VALVE DEVICE | SECOND SHUT-OFF VALVE DEVICE | THIRD SHUT-OFF VALVE DEVICE | FR | RL |
|---|---|---|---|---|---|
| 1 | ◯ | ◯ | ✕ | M/C INCREASE | M/C INCREASE |
| 2 | ◯ | ✕ | ✕ | M/C INCREASE | HOLD |
| 3 | ◯ | ✕ | ◯ | M/C INCREASE | DECREASE |
| 4 | ✕ | ✕ | ✕ | PUMP INCREASE | HOLD |
| 5 | ✕ | ✕ | ◯ | PUMP INCREASE | DECREASE |
| 6 | ✕ | ◯ | ✕ | HOLD | PUMP INCREASE |
| 7 | ✕ | ◯ | ◯ | DECREASE | DECREASE |
| 8 | ◯ | ◯ | ◯ | — | — |

◯ : OPEN   ✕ : CLOSED

VEHICLE ANTI-LOCK BRAKING SYSTEM ADAPTED TO DETERMINE PRESSURE CONTROL MODE OF ONE OF REAR BRAKE CYLINDERS DEPENDING UPON THAT OF THE OTHER REAR BRAKE CYLINDER

This application is based on Japanese Patent Application No. 8-109031 filed Apr. 30, 1996, the content of which is incorporated hereinto by reference.

CROSS REFERENCE TO RELATED APPLICATIONS

Not Applicable

BACKGROUND OF THE INVENTION

1. Field of the Invention

The present invention relates in general to an anti-lock or anti-skid braking system of a motor vehicle, and more particularly to techniques for suitably controlling braking pressures for rear right and left wheels of the vehicle.

2. Discussion of the Related Art

There is known a braking system of diagonal or X-crossing type, which is used for four-wheel motor vehicle having front right and left wheels and rear right and left wheels. This diagonal type braking system has two pressure application sub-systems connected to respective two mutually independent fluid pressurizing chambers of a master cylinder. One of the sub-systems includes a front left wheel brake cylinder and a rear right wheel brake cylinder, while the other sub-system includes a front right wheel brake cylinder and a rear left wheel brake cylinder. Each pressure application sub-system further includes a reservoir, a pump for pressurizing the fluid received from the reservoir, and at least one solenoid-operated valve device each of which is disposed in a fluid passage connected to at least one of the pressurizing chambers, wheel brake cylinders, reservoir and pump, so that the fluid pressure in each wheel brake cylinder is controlled. The pressure application sub-system is constructed such that a decrease in the fluid pressure in the front wheel brake cylinder will necessarily cause a decrease in the fluid pressure in the rear wheel brake cylinder. A controller is provided to control each solenoid-operated valve device for suitably controlling the fluid pressure (I.e., braking pressure) in each of the wheel brake cylinders, in an anti-lock fashion so as to prevent an excessive amount of slip of each wheel during braking of the vehicle.

An example of an anti-lock braking system of the type described above is disclosed in U.S. Pat. No. 5,538,334 to Kushi et al., which corresponds to JP-A-7-223529.

In the braking system disclosed in the above-identified U.S. Patent, each of the two pressure application sub-systems has a front brake cylinder passage connecting one of the pressurizing chambers of the master cylinder to the front wheel brake cylinder, and a rear brake cylinder passage which is connected at one end thereof to the front brake cylinder passage and at the other end to the rear wheel brake cylinder. A first solenoid-operated valve device is disposed in a portion of the front brake cylinder passage between the master cylinder and a point of connection between the front and rear brake cylinder passages, and a second solenoid-operated valve device is disposed in the rear brake cylinder passage. Further, a reservoir passage is connected at one end thereof to a portion of the rear brake cylinder passage between the second solenoid-operated valve device and the rear wheel brake cylinder, and at the other end to the reservoir. A third solenoid-operated valve device is disposed in this reservoir passage. In addition, a pump passage is connected at one end thereof to the reservoir, and at the other end to the front brake cylinder passage or a portion of the rear brake cylinder passage between the second solenoid-operated valve device and the point of connection to the front brake cylinder passage. The pump is disposed in the pump passage. To lower the braking pressure in the front wheel brake cylinder in each pressure application sub-system of this braking system, both of the second and third solenoid-operated valve devices must be simultaneously opened for fluid communication of the front wheel brake cylinder with the reservoir. As a result, the braking pressure in the rear wheel brake cylinder of the same pressure application sub-system is necessarily communicated with the reservoir and is consequently lowered.

In the braking system of the type described above, the controller generally includes control mode selecting means and solenoid valve control means for controlling the braking pressures in the brake cylinders of the rear right and left wheels. The control mode selecting means is adapted to select one of a plurality of pressure control modes, for each rear wheel brake cylinder. The pressure control modes include a pressure decrease mode, a pressure hold mode and a pressure increase mode. The solenoid valve control means is adapted to control at least one solenoid-operated valve device so as to establish the selected pressure control mode for each of the rear wheels.

The braking pressures in the brake cylinders of the rear right and left wheels are usually controlled according to a so-called "Select Low Control", which is formulated to assure a high level of running stability of the vehicle during braking on a road surface which has different values of friction coefficient in its right and left areas on which the right and left wheels are running. According to the "Select Low Control", the same pressure control mode is established for both of the rear right and left wheels, even if the different pressure control modes are normally selected according to a normal "Independent Control" in which the pressure control modes for the two rear wheels are selected independently of each other. That is, where the pressure control modes normally selected for the rear right and left wheels are different from each other, one of these two control modes which causes a large amount of decrease of the rear braking pressure than the other control mode is used for both of the rear wheels. This "Select Low Control" of the rear wheel braking pressures results in a decrease in the rear braking forces, but assures an increase in the maximum lateral forces acting on the rear wheels, making it possible to reduce lateral movements of the rear portion of the vehicle during braking. That is, the vehicle running stability during braking is improved at the sacrifice of the rear braking forces, according to the "Select Low Control" of the rear braking pressures.

Described more specifically, if the pressure decrease mode or pressure hold mode is normally selected for one of the rear right and left wheels according to the "Independent Control" while the pressure increase mode is normally selected for the other rear wheel according to the "Independent Control", the braking pressure for this other rear wheel is also controlled in the pressure decrease or hold mode selected for the above-indicated one rear wheel. In this case, the braking pressures of the two rear wheels are lowered or remain unchanged. Similarly, if the pressure decrease mode is normally selected for one of the rear wheels while the pressure hold mode is normally selected for the other rear wheel, the braking pressure for the other rear wheel is also controlled in the pressure decrease mode selected for the above-indicated one rear wheel. In this case, the braking pressures of the two rear wheels are lowered.

As a result of research on a vehicle anti-lock braking system of diagonal type adapted to control the braking pressures of the rear wheel brake cylinders according to the "Select Low Control", the present inventor recognized a need of improvement in such a braking system regarding the control of the rear wheel brake cylinder pressures.

As described above, the "Select Low" control of the braking pressures of the rear wheels aims at improving the running stability of the vehicle during braking, at the sacrifice of the rear braking forces. To attain a satisfactory level of compromise between the reduction of the required braking distance of the vehicle and the running stability, it is important to prevent an excessively large amount of reduction of the rear braking forces. In this respect, it is noted that the braking system of the diagonal or X-crossing type is constructed such that the braking pressure in the rear wheel in each pressure application sub-system is necessarily reduced upon reduction of the braking pressure in the front wheel in the same sub-system, as described above, even when the reduction of the rear wheel braking pressure is not required. Therefore, the practicing the "Select Low Control" as originally intended may cause an unnecessarily large amount of reduction of the rear wheel brake cylinder pressure, and an accordingly large amount of reduction of the rear wheel braking forces, which is unnecessary to assure a satisfactory degree of the vehicle running stability during braking.

SUMMARY OF THE INVENTION

It is therefore an object of the present invention to provide an anti-lock braking system of a motor vehicle, which provides a satisfactory compromise between the running stability of the vehicle during braking and the reduction of the required braking distance of the vehicle.

The above object may be achieved according to a first aspect of the present invention, which provides an anti-lock braking system of diagonal type of a motor vehicle having front right and left wheels and rear right and left wheels, the braking system having two pressure application sub-systems connected to respective two mutually independent pressurizing chambers of a master cylinder, one of the two sub-systems including a front right wheel brake cylinder for braking the front right wheel and a rear left wheel brake cylinder for braking the rear left wheel, while the other of the two sub-systems including a front left wheel brake cylinder for braking the front left wheel and a rear right wheel brake cylinder for braking the rear right wheel, each of the two sub-systems further including a reservoir, a pump, and at least one solenoid-operated valve device, the braking system including a controller for controlling the at least one solenoid-operated valve device and the pump of each sub-system, to control braking pressures in the front and rear wheel brake cylinders in an anti-lock fashion so as to prevent an excessive amount of slip of the front and rear wheels, each sub-system being constructed such that the braking pressure in the rear wheel brake cylinder is reduced upon reduction of a braking pressure in the front wheel brake cylinder, wherein the controller comprises: (a) control mode determining means for determining, as an effective control mode, for each of the rear right and left wheel brake cylinders of the two pressure application sub-systems, one of a plurality of pressure control modes including a pressure decrease mode, a pressure hold mode and a pressure increase mode in which the braking pressure in each rear wheel brake cylinder is reduced, held constant and increased, respectively, the control mode determining means determining the effective control modes for the rear wheel brake cylinders such that if the pressure control modes which are normally selected for the rear wheel brake cylinders independently of each other are different from each other and include the pressure decrease mode, the pressure decrease mode selected for one of the rear wheel brake cylinders is determined as the effective control mode for the above-indicated one of the rear wheel brake cylinders, while one of the plurality of pressure control modes which is other than the pressure control mode normally selected for the other of the rear right and left wheel brake cylinders is determined as the effective control mode for the above-indicated other of the rear wheel brake cylinders, the above-indicated one of the plurality of pressure control modes which is determined as the effective control mode for the above-indicated other of the rear wheel brake cylinders causing the braking pressure in the above-indicated other of the rear wheel brake cylinders to be lower than when the pressure control mode normally selected for the above-indicated other of the rear wheel brake cylinders is determined as the effective control mode, the control mode determining means determining the pressure control modes normally selected for the rear wheel brake cylinders, as the effective control modes for the rear right and left wheel brake cylinders, respectively, if the pressure control modes normally selected are different from each other and consist of the pressure hold mode selected for one of the rear wheel brake cylinders and the pressure increase mode selected for the above-indicated other of the rear wheel brake cylinders; and (b) solenoid valve device control means for controlling the at least one solenoid-operated valve device to establish the effective control modes determined by the control mode determining means for the rear right and left wheel brake cylinders.

The "Select Low Control" of the braking pressures in the rear wheel brake cylinders, which has been described above, is formulated such that if the two different pressure control modes which would be selected independently of each other according to the "Independent Control" include the pressure hold mode which is selected for one of the rear wheel brake cylinders and which causes the braking pressure in this one rear wheel brake cylinder to be lower than that in the other rear wheel brake cylinder, one of the control modes which is not normally selected for the other rear wheel brake cylinder and which causes the braking pressure in that other rear wheel brake cylinder to be lower than when the control mode normally selected for that other rear wheel brake cylinder is determined as the effective control mode is determined as the effective control mode for that other rear wheel brake cylinder, as in the case where the two different control modes normally selected include the pressured decrease mode. However, where the control mode which is normally selected for one of the rear wheel brake cylinders and which causes the braking pressure in this one rear wheel brake cylinder to be lower than that in the other rear wheel brake cylinder is the pressure hold mode, it is not absolutely necessary to determine, as the effective control mode for that other rear wheel brake cylinder, one of the control modes which is not normally selected for the other rear wheel brake cylinder and which causes the braking pressure in that other rear wheel brake cylinder to be lower than when the control mode normally selected for that other rear wheel brake cylinder is determined as the effective control mode. In other words, it is necessary to determine the effective control modes according to the "Select Low Control", particularly where the normally selected two different control modes include the pressure decrease mode for one of the rear wheel brake cylinders. In this case, it is desirable that one of the control modes which is different from the control mode normally selected for the other rear wheel brake cylinder and which causes the braking pressure in this other rear wheel brake cylinder to be lower than when the normally selected control mode is determined as the effective control mode be determined as the effective control mode for that other rear wheel brake cylinder. The selection of the pressure decrease mode for one of the rear wheel brake cylinders according to the "Independent Control" means that the actual slip ratio of the rear wheel corresponding to that one rear wheel brake cylinder is higher than an upper limit of an optimum range of the slip ratio, or is about to exceed the upper limit. In this case, the lateral force acting on the rear wheel corresponding to the above-indicated one rear wheel brake cylinder is considerably small or about to be considerably reduced. In this event, therefore, it is necessary to reduce the braking force of the other rear wheel for increasing its lateral force to thereby reduce an amount of decrease of the overall lateral force acting on the motor vehicle, for the purpose of preventing deterioration of the running stability of the vehicle during braking.

In the light of the above finding, the control mode determining means of the controller of the present anti-lock braking system is adapted to determine the effective control modes for the rear wheel brake cylinders such that if the two different control modes which would be normally selected for the two rear wheel brake cylinders include the pressure decrease mode for one of the rear wheels, the braking pressure in the other rear wheel brake cylinder is controlled in the effective control mode which is different from the normally selected control mode and which causes the braking pressure in that other rear wheel brake cylinder to be lower than when the normally selected control mode is selected as the effective control mode, and such that if the two different control modes normally selected consist of the pressure hold mode for one of the rear wheel brake cylinders and the pressure increase mode selected for the other rear wheel brake cylinder, the control mode normally selected for the above-indicated other rear wheel brake cylinder according to the "Independent Control" is determined as the effective control mode for that other rear wheel brake cylinder.

Therefore, the control mode determining means according to the principle of the invention assures a satisfactory level of the running stability of the vehicle during braking while minimizing the reduction of the rear wheel braking forces, in an anti-lock braking pressure control operation of the braking system, which is constructed such that the braking pressure in the rear wheel brake cylinder of each pressure application sub-system is reduced upon reduction of the braking pressure in the front wheel brake cylinder of the same sub-system. The control of the braking pressures in the rear wheel brake cylinders according to the first aspect of the invention is intermediate between the "Independent Control" and the "Select Low Control".

In a first preferred form of this invention, each of the pressure application sub-system further includes a front brake cylinder passage connecting a corresponding one of the two pressurizing chambers of the master cylinder and the front wheel brake cylinder, a rear brake cylinder passage which is connected at one end thereof to the front brake cylinder passage and at the other end to the rear wheel brake cylinder, a first solenoid-operated valve device disposed in a portion of the front brake cylinder passage between the master cylinder and a point of connection between the front and rear brake cylinder passages, a second solenoid-operated valve device disposed in the rear brake cylinder passage, a reservoir passage which is connected at one end thereof to a portion of the rear brake cylinder passage between the second solenoid-operated valve device and the rear wheel brake cylinder and at the other end to the reservoir, a third solenoid-operated valve device disposed in the reservoir passage, and a pump passage which is connected at one end thereof to the reservoir and at the other end to one of the front brake cylinder passage and a portion of the rear brake cylinder passage between the second solenoid-operated valve device and the point of connection.

In the above first preferred form of the braking system, the braking pressures in the front and rear wheel brake cylinders of each pressure application sub-system are controlled by the three solenoid-operated valve devices. Thus, the number of the solenoid-operated valve devices used for the entire braking system is relatively small, leading to a reduced cost of manufacture of the braking system.

In a second preferred form of the present invention, the control mode determining means is adapted to determine the pressure decrease mode as the effective control mode for the above-indicated other rear wheel brake cylinders if the pressure control modes which would be normally selected for the rear wheel brake cylinder independently of each other include the pressure decrease mode selected for the above-indicated one rear wheel brake cylinder.

If the two different pressure control modes which would be normally selected for the respective rear wheel brake cylinders independently of each other include the pressure decrease mode for one of the rear wheel brake cylinders, the pressure control mode normally selected for the other rear wheel brake cylinder is either the pressure hold mode or the pressure increase mode. In this case, the control mode determining means may be adapted to determine the pressure decrease mode as the effective control mode for the above-indicated other rear wheel brake cylinder if the pressure hold mode is normally selected for this other rear wheel brake cylinder, and determine the pressure hold mode as the effective control mode for that other rear wheel brake cylinder if the pressure increase mode is normally selected for this other rear wheel brake cylinder. However, this control arrangement requires the control mode determining means to determine whether the control mode normally selected to the other rear wheel brake cylinder is the pressure hold mode or the pressure increase mode, and determine the effective control mode for this other rear wheel brake cylinder depending upon the normally selected control mode of that rear wheel brake cylinder. Accordingly, this arrangement tends to be complicated in control software, as compared with the control arrangement according to the above-indicated second preferred form of the invention in which the pressure decrease mode is always determined as the effective control mode for the other rear wheel brake cylinder if the pressure decrease mode is normally selected for the above-indicated one rear wheel brake cylinder.

In the above case where the pressure decrease mode is normally selected for one of the rear wheel brake cylinders, the pressure hold mode may be always determined as the effective control mode for the other rear wheel brake cylinder, irrespective of the pressure control mode normally selected for that other rear wheel brake cylinder. This control arrangement is also effective to prevent complicated software for determining the effective control modes for the rear wheel brake cylinders. In this case, however, the effective control mode determined for the above-indicated other rear wheel brake cylinder is the same as the control mode normally selected for that other rear wheel brake cylinder if the normally selected control mode for this other rear wheel brake cylinder is the pressure hold mode. Therefore, this control arrangement may not be effective enough to reduce the overall rear braking pressure for obtaining a sufficient increase in the lateral forces of the rear wheels for thereby assuring a satisfactory degree of running stability of the vehicle during braking, if the pressure hold mode is normally selected for the above-indicated other rear wheel brake cylinder.

In the above second preferred form of the braking system, which is based on the above finding, the control mode determining means determines the pressure decrease mode as the effective control mode for the above-indicated other rear wheel brake cylinder, irrespective of the control mode normally selected for that rear wheel brake cylinder, if the pressure decrease mode is normally selected fro the above-indicated one rear wheel brake cylinder.

Accordingly, the braking system according to the above second preferred form of this invention permits not only a satisfactory degree of the vehicle running stability, but also a relatively simple control software for determining the effective control modes for the rear wheel brake cylinders, resulting in an accordingly improved operating reliability of the braking system.

In a third preferred form of the present invention, the control mode determining means determines, as the effective mode for the other of the rear wheel brake cylinders, the above-indicated one of the plurality of pressure control modes which is other other the pressure control mode normally selected for the other rear wheel brake cylinder and which causes the braking pressure in the other rear wheel brake cylinder to be lower than when the pressure control mode normally selected for the other rear wheel brake cylinder is determined as the effective control mode, if the pressure control modes which would be normally selected for the rear wheel brake cylinders independently of each other are different from each other and include the pressure decrease mode and if a friction coefficient of a road surface on which the motor vehicle is running is lower than a predetermined threshold, the control mode determining means determining, as the effective mode for the other rear wheel brake cylinder, the pressure control mode normally selected for the other rear wheel brake cylinder, if the pressure control modes which would be normally selected for the rear wheel brake cylinders consist of the pressure hold mode for the one rear wheel brake cylinder and the pressure increase mode which is normally selected for the other rear wheel brake cylinder, or if the friction coefficient of the road surface is not lower than the threshold.

The control mode determining means may be adapted to determine the effective control, modes for the rear wheel brake cylinders, irrespective of the friction coefficient of the road surface on which the vehicle is running. However, the need of improving the running stability of the vehicle during braking is higher when the friction coefficient of the road surface is relatively low.

In the light of the above finding, the control mode determining means according to the above third preferred form of the invention is adapted to determine, as the effective mode for the above-indicated other rear wheel brake cylinder, the pressure control mode which causes the braking pressure in this other rear wheel brake cylinder to be higher than when the pressure control mode normally selected for that other ear wheel brake cylinder is determined as the effective control mode, only if the friction coefficient of the road surface is lower than the predetermined threshold. If the friction coefficient is not lower than the threshold, the pressure control mode normally selected for the above-indicated other rear wheel brake cylinder is determined as the effective control mode for this rear wheel brake cylinder, even if the normally selected two different pressure control modes include the pressure decrease mode.

Therefore, the above third preferred form of the braking system is effective to reduce the amount of reduction of the rear wheel braking force for thereby improving the running stability of the vehicle, when the friction coefficient of the road surface is relatively high.

In a fourth preferred form of this invention, the control mode determining means comprises: normal control mode selecting means for selecting normal control modes from the plurality of pressure control modes, for the rear wheel brake cylinders, respectively, independently of each other; and control mode changing means for changing the normal control mode selected for the above-indicated other of the rear wheel brake cylinder to one of the plurality of pressure control mode which is determined as the effective control mode for the above-indicated other rear wheel brake cylinder and which causes the braking pressure to be lower than when the normal control mode selected for the above-indicated other rear wheel brake cylinder is determined as the effective control mode for the above-indicated other rear wheel brake cylinder, if the normal control modes selected for the rear wheel brake cylinders are different from each other and include the pressure decrease mode. The control mode changing means determines, as the effective control mode for the above-indicated other of the rear wheel brake cylinders, the normal control mode selected for the above-indicated other rear wheel brake cylinder, if the normal control modes selected for the rear wheel brake cylinders consist of the pressure hold mode selected as the normal control mode for the above-indicated one of the rear wheel brake cylinder and the pressure increase mode selected as the normal control mode for the above-indicated other rear wheel brake cylinder.

In one advantageous arrangement of the above third preferred form of the braking system described above, the control mode determining means comprises: normal control mode selecting means for selecting normal control modes from the plurality of pressure control modes, for the rear wheel brake cylinders, respectively, independently of each other; and control mode changing means for changing the normal control mode selected for the above-indicated other of the rear wheel brake cylinder to one of the plurality of pressure control mode which is determined as the effective control mode for the above-indicated other rear wheel brake cylinder and which causes the braking pressure to be lower than when the normal control mode selected for the above-indicated other rear wheel brake cylinder is determined as the effective control mode for the above-indicated other rear wheel brake cylinder, if the normal control modes selected for the rear wheel brake cylinders are different from each other and include the pressure decrease mode, and if a friction coefficient of a road surface on which the motor vehicle is running is lower than a predetermined threshold. The control mode changing means determines, as the effective control mode for the above-indicated other of the rear wheel brake cylinders, the normal control mode selected for the above-indicated other rear wheel brake cylinder, if the normal control modes selected for the rear wheel brake cylinders consist of the pressure hold mode selected as the normal control mode for the above-indicated one of the rear wheel brake cylinder and the pressure increase mode selected as the normal control mode for the above-indicated other rear wheel brake cylinder, or if the friction coefficient of the road surface is not lower than the threshold.

The object indicated above may also be achieved according to a second aspect of this invention, which provides an anti-lock braking system of a motor vehicle having front right and left wheels and rear right and left wheels, the braking system having a rear right wheel brake cylinder for braking the rear right wheel, a rear left wheel brake cylinder for braking the rear left wheel, at least one solenoid-operated valve device, and a controller for controlling the at least one solenoid-operated valve device, to control braking pressures in the rear right and left wheel brake cylinders, in an anti-lock fashion so as to prevent an excessive amount of slip of the rear wheels, wherein the controller comprises: (a) control mode determining means for determining, as an effective control mode, for each of the rear right and left wheel brake cylinders, one of a plurality of pressure control modes including a pressure decrease mode, a pressure hold mode and a pressure increase mode in which the braking pressure in the each rear wheel brake cylinder is reduced, held constant and increased, respectively, the control mode determining means determining the effective control modes for the rear wheel brake cylinders such that if the pressure control modes which would be normally selected for the rear wheel brake cylinders independently of each other are different from each other and include the pressure decrease mode, the pressure decrease mode selected for one of the rear wheel brake cylinders is determined as the effective control mode for the above-indicated one of the rear wheel brake cylinders, while one of the plurality of pressure control modes which is other than the pressure control mode normally selected for the other of the rear right and left wheel brake cylinders is determined as the effective control mode for the above-indicated other of the rear wheel brake cylinders, the above-indicated one of the plurality of pressure control modes which is determined as the effective control mode for the above-indicated other of the rear wheel brake cylinders causing the braking pressure in the above-indicated other of the rear wheel brake cylinders to be lower than when the pressure control mode normally selected for the above-indicated other of the rear wheel brake cylinders is determined as the effective control mode, the control mode determining means determining the pressure control modes normally selected for the rear wheel brake cylinders, as the effective control modes for the rear right and left wheel brake cylinders, respectively, if the pressure control modes normally selected are different from each other and consist of the pressure hold mode selected for one of the rear wheel brake cylinders and the pressure increase mode selected for the above-indicated other of the rear wheel brake cylinders; and (b) solenoid valve device control means for controlling the at least one solenoid-operated valve device to establish the effective control modes determined by the control mode determining means for the rear right and left wheel brake cylinders.

The control mode determining means of the controller of the braking system constructed according to the second aspect of the invention is identical with the control mode determining means according to the first aspect of the invention, except that the present braking system is not limited to the diagonal or X-crossing type described above with respect to the first aspect of the invention in which each of the two sub-systems has a front wheel brake cylinder and rear wheel brake cylinder. Thus, the principle of the present invention is applicable to any type of anti-lock braking system other than the diagonal type, so as to permit the braking system to assure a satisfactory compromise between the running stability of the vehicle during braking and the reduction of the required braking distance of the vehicle, owing to the control which is intermediate between the "Independent Control" and the "Select Low Control" which have been discussed above. For instance, the control mode determining means is applicable to an anti-lock braking system having two pressure application sub-systems one of which includes brake cylinders for the front wheels, and the other of which includes brake cylinders for the rear wheels.

The object indicated above may also be achieved according to a third aspect of this invention, which provides an anti-lock braking system of a motor vehicle having front right and left wheels and rear right and left wheels, the braking system having a rear right wheel brake cylinder for braking the rear right wheel, a rear left wheel brake cylinder for braking the rear left wheel, at least one solenoid-operated valve device, and a controller for controlling the at least one solenoid-operated valve device, to control braking pressures in the rear right and left wheel brake cylinders, in an anti-lock fashion so as to prevent an excessive amount of slip of the rear wheels, wherein the controller controls the at least one solenoid-operated valve device to control the braking pressures in the rear right and left wheel brake cylinders such that while the braking pressure in one of the rear right and left wheel brake cylinders is reduced, the braking pressure in the other of the rear right and left wheel brake cylinders is also reduced, such that while the braking pressure in the above-indicated one of the rear right and left wheel brake cylinders is increased, the braking pressure in the above-indicated other of the rear right and left wheel brake cylinders is not necessarily increased, and such that while the braking pressure in the above-indicated one of the rear right and left wheel brake cylinders is held constant, the braking pressure in the above-indicated other of the rear right and left wheel brake cylinders is not necessarily held constant.

The braking system according to the above third aspect of this invention may be a diagonal or X-crossing type anti-lock braking system having two pressure application sub-systems connected to respective two mutually independent pressurizing chambers of a master cylinder. In this case, one of the two sub-systems includes a front right wheel brake cylinder for braking the front right wheel and the rear left wheel brake cylinder for braking the rear left wheel, while the other sub-system includes a front left wheel brake cylinder for braking the front left wheel and the rear right wheel brake cylinder for braking the rear right wheel. Further, each of the two sub-systems further includes a reservoir, a pump connected to the reservoir, and the above-indicated at least one solenoid-operated valve device, and is constructed such that the braking pressure in the rear wheel brake cylinder is reduced upon reduction of the braking pressure in the front wheel brake cylinder.

In the diagonal anti-lock braking system indicated above, each pressure application sub-system may further include a front brake cylinder passage connecting a corresponding one of the two pressurizing chambers of the master cylinder and the front wheel brake cylinder, a rear brake cylinder passage which is connected at one end thereof to the front brake cylinder passage and at the other end to the rear wheel brake cylinder, a first solenoid-operated valve device disposed in a portion of the front brake cylinder passage between the master cylinder and a point of connection between the front and rear brake cylinder passages, a second solenoid-operated valve device disposed in the rear brake cylinder passage, a reservoir passage which is connected at one end thereof to a portion of the rear brake cylinder passage between the second solenoid-operated valve device and said rear wheel brake cylinder and at the other end to said reservoir, a third solenoid-operated valve device disposed in said reservoir passage, and a pump passage which is connected at one end thereof to the reservoir and at the other end to one of the front brake cylinder passage and a portion of the rear brake cylinder passage between the second solenoid-operated valve device and the point of connection between the front and rear brake cylinder passages.

In one advantageous arrangement of the braking system according to the first preferred form of the first aspect of the invention described above, the above-indicated other end of the pump passage is connected to a portion of the front brake cylinder passage between the first solenoid-operated valve device and the front wheel brake cylinder or the rear brake cylinder passage between the second solenoid-operated valve device and the point of connection of the front and rear brake cylinder passages. In this case, the controller operates the pump while the first solenoid-operated valve device is held closed, so that the braking pressures in the front and rear wheel brake cylinders are increased by operation of the pump during an operation of the braking system in the anti-lock fashion.

In the above advantageous arrangement, the pressurized fluid delivered from the pump is not returned to the master cylinder but is returned to the portion of the front or rear brake cylinder passage which is disconnected from the master cylinder by the first solenoid-operated valve device held in the closed state. Since the pressure in that portion of the front or rear brake cylinder passage is lower than that in the master cylinder, the pressure of the fluid delivered from the pump need not be raised to the level of the pressure in the master cylinder. Accordingly, the required capacity of the pump and that of the motor to drive the pump may be reduced.

In the same advantageous arrangement as described above, the pressure increase mode indicated above may include a pump increase mode in which the braking pressures in the front and rear wheel brake cylinders of each pressure application sub-system are increased by operation of the pump. In this case, the mode determining means may be adapted to select the effective control modes for the front and rear wheel brake cylinders, from the plurality of pressure control modes including the pump increase mode as well as the pressure decrease mode and the pressure hold mode, on the basis of rotating conditions of the front and rear wheels.

In the above case, the control mode determining means may include detecting means for detecting the rotating conditions of the front and rear wheels, on the basis of at least one of a rotating speed of each of the front and rear wheels, an acceleration value of each of the front and rear wheels, and an amount of slip of each of the front and rear wheels which is a difference between the rotating speed of the wheel and a running speed of the vehicle.

The detecting means indicated above may include at least one of speed sensors for detecting the rotating speeds of the front and rear wheels, wheel acceleration obtaining means for obtaining the acceleration values of the front and rear wheels, a vehicle speed obtaining means for obtaining the running speed of the vehicle, and slip amount obtaining means for obtaining the amount of slip of the front and rear wheels.

The wheel acceleration obtaining means may be wheel acceleration sensors for directly detecting the acceleration values of the front and rear wheels, or include means for calculating the acceleration values of the front and rear wheels from the rotating speeds of these wheels detected by the wheel speed sensors. The vehicle speed obtaining means may be a Doppler-effect sensor for directly detecting the running speed of the vehicle, or include means for estimating the vehicle running speed from the rotating speeds of the front and rear wheels detected by the wheel speed sensors. The slip amount obtaining means may be adapted to determine a difference between the rotating speed of each wheel and the vehicle running speed as the slip amount of each wheel, or calculates the slip amount by dividing this difference by the vehicle running speed or the rotating speed of the wheel.

In the above arrangement wherein the pump increase mode is provided, the solenoid valve device control means may include memory means for storing data representative of a relationship between the pressure control modes which are normally selected for the front and rear wheel brake cylinders and respective combinations of operating states of the first, second and third solenoid-operated valve devices. In this case, the solenoid valve device control means further comprises solenoid valve state control means for selecting the operating states of the first, second and third solenoid-operated valve devices on the basis of the effective control mode determined by the control mode determining means for the rear wheel brake cylinder and an effective control mode determined for the front wheel brake cylinder, and according to the relationship indicated above. This relationship indicates the closed states of the first, second and third solenoid-operated valve devices where the determined effective mode for the front wheel brake cylinder of each sub-system is the pump increase mode while the determined effective mode for the rear wheel brake cylinder of the same sub-system is the pressure hold mode. The relationship also indicates the closed states of the first and second solenoid-operated valve devices and the open state of the third solenoid-operated valve device where the determined effective mode for the front wheel brake cylinder is the pump increase mode while the determined effective control mode for the rear wheel brake cylinder is the pressure decrease mode. The relationship also indicates the closed states of the first and third solenoid-operated valve devices and the open state of the second solenoid-operated valve device where the determined effective control mode for the front wheel brake cylinder is the pressure hold mode while the determined effective control mode for the rear wheel brake cylinder is the pump increase mode. The relationship further indicates the closed state of the first solenoid-operated valve device and the open states of the second and third solenoid-operated valve devices where the determined effective control modes for the front and rear wheel brake cylinders are the pressure decrease mode.

In the third and fourth preferred forms of the first aspect of the invention, the control mode determining means may include means for detecting a deceleration value of the motor vehicle, and means for determining the friction coefficient of the road surface on the basis of the detected deceleration value of the vehicle such that the friction coefficient decreases with a decrease in the vehicle deceleration value.

BRIEF DESCRIPTION OF THE DRAWINGS

The above and optional objects, features, advantages and industrial and technical significance of this invention will be better understood by reading the following detailed description of presently preferred embodiments of the invention, when considered in connection with the accompanying drawings, in which:

FIG. 4 is a view showing waveforms of signals for controlling solenoid-operated shut-off valve devices, for explaining an operation of a mode change control portion 92 of the controller 60 of FIG. 3;

FIG. 6 is a view indicating a relationship stored in ROM 64 of the controller 60, between combinations of operating states of the shut-off valve devices and front and rear pressure control modes;

DETAILED DESCRIPTION OF THE PREFERRED EMBODIMENTS

Figure 1:
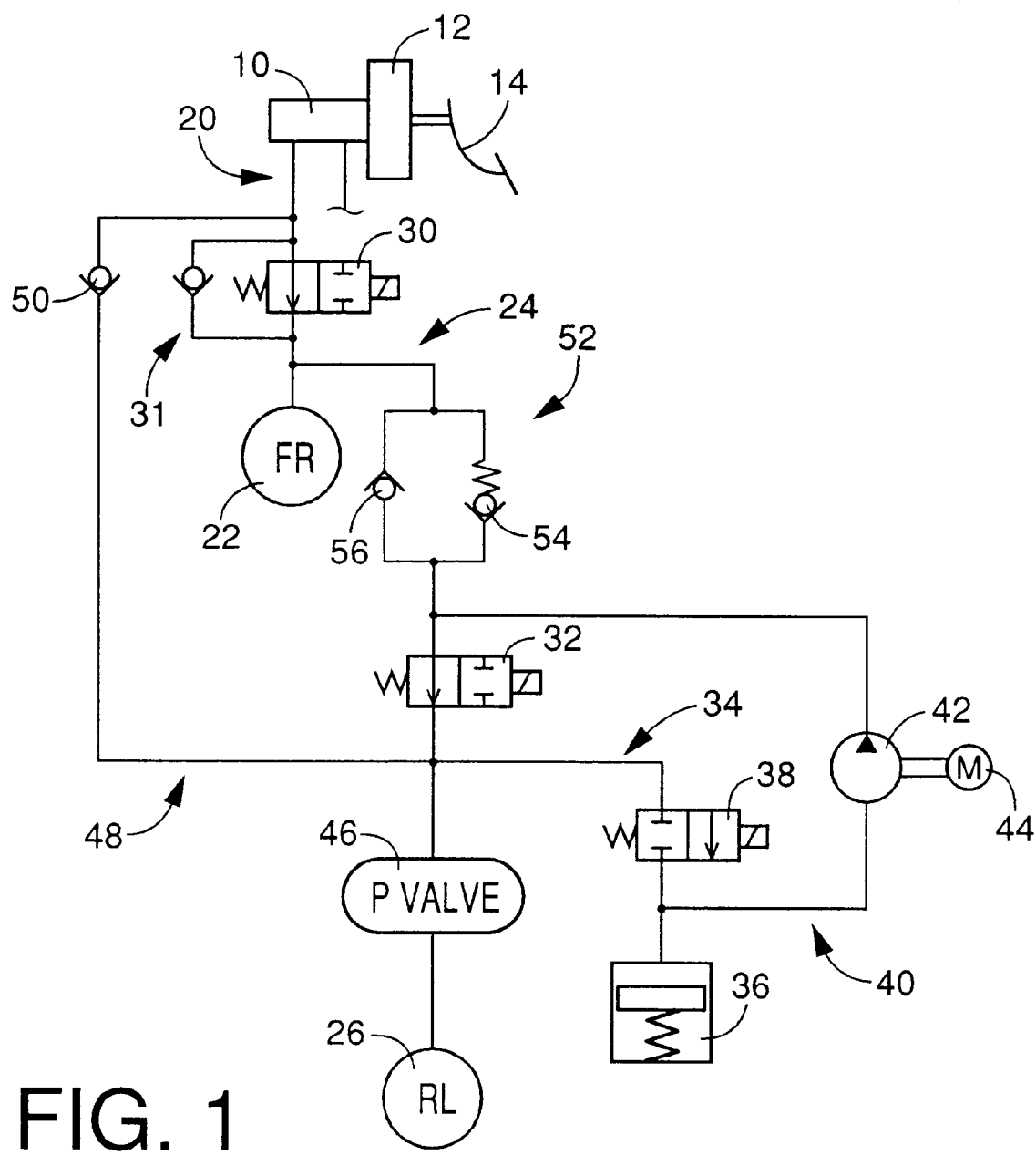
FIG. 1 is a schematic view of an anti-lock braking system of diagonal type constructed according to one embodiment of the present invention.

Referring first to FIG. 1, there is shown a mechanical arrangement of an anti-lock braking system of diagonal or X-crossing type for a motor vehicle, which is constructed according to one embodiment of this invention.

In FIG. 1, reference numeral 10 denotes a master cylinder 10 of tandem type in which two mutually independent fluid pressurizing chambers are formed in series. The master cylinder 10 is linked with a brake operating member in the form of a brake pedal 14 through a booster 12. Upon operation or depression of the brake pedal 14 by an operator of the motor vehicle, equal fluid pressures are generated in the two pressurizing chambers of the master cylinder 10, such that the generated fluid pressures vary with an operating force which acts on the brake pedal 14.

One of the pressurizing chambers of the master cylinder 10 is connected to a brake cylinder of a front left wheel and a brake cylinder of a rear right wheel of the vehicle, while the other pressurizing chamber is connected to brake cylinders of a front right wheel and a rear left wheel of the vehicle. The braking system has two mutually independent pressure application sub-systems. In the first pressure application sub-system, one of the pressurizing chambers of the master cylinder 10 functions as a pressure source, and the fluid pressures in the brake cylinders of the front left and rear right wheels are controlled. In the second pressure application sub-system, the other pressurizing chamber functions as a pressure source, and the fluid pressures in the brake cylinders of the front right and rear left wheels are controlled. Since the first and second pressure application sub-systems are identical with each other in construction, only the second pressure application sub-system will be described by reference to FIG. 1.

In the pressure application sub-system of FIG. 1, one of the pressurizing chambers of the master cylinder 10 is connected to a brake cylinder 22 of the front right wheel FR through a front brake cylinder passage 20. A rear brake cylinder passage 24 is connected at one end thereof to the front brake cylinder passage 20 and at the other end to a brake cylinder 26 of the rear left wheel RL.

In a portion of the front brake cylinder passage 20 between the master cylinder 10 and a point of connection to the rear brake cylinder passage 24, there is disposed a normally-open first solenoid-operated shut-off valve device 30. That is, the first shut-off valve device 30 is located upstream of the point of connection between the front and rear brake cylinder passages 20, 24. To the front brake cylinder passage 20, there is also connected a return passage 31 which by-passes the first shut-off valve device 30. This return passage 31 incorporates a check valve, which inhibits a flow of the fluid in the direction from the master cylinder 10 toward the front wheel brake cylinder 22, and permits a flow of the fluid in the opposite direction. The check valve in the return passage 31 is provided to return the fluid from the front wheel brake cylinder 22 back to the master cylinder 10 at a considerably high rate.

In the rear brake cylinder passage 24, there is provided a normally-open second solenoid-operated shut-off valve device 32. A reservoir passage 34 is connected at one end thereof to a portion of the rear brake cylinder passage 24 between the second shut-off valve device 32 and the rear wheel brake cylinder 26, and at the other end to a reservoir 36. In the reservoir passage 34, there is disposed a normally-closed third solenoid-operated shut-off valve device 38.

A pump passage 40 is connected at one end thereof to the reservoir passage 34 and at the other end to a portion of the rear brake cylinder passage 24 between the second shut-off valve device 32 and the point of connection to the front brake cylinder passage 20. A pump 42 driven by a motor 44 is connected to the pump passage 40, for pressuring the fluid received from the reservoir 36 and delivering the pressurized fluid to the above-indicated portion of the rear brake cylinder passage 24.

In a portion of the rear brake cylinder passage 24 between the second shut-off valve device 32 and the rear wheel brake cylinder 26, there is disposed a proportioning valve 46 (hereinafter referred to as "P valve 46"). The P valve 46 is a pressure reducing valve for controlling the fluid pressure in the rear wheel brake cylinder 26, according to a predetermined front-rear distribution line, as well known in the art. Described in detail, the output pressure of the P valve 46 which is applied to the rear wheel brake cylinder 26 is held equal to the input pressure (i.e., pressure in the master cylinder 10, or delivery pressure of the pump 42) until the input pressure increases to a predetermined level with an increase in the pressure in the master cylinder 10. After the input pressure reaches the predetermined level (bent point of the front-rear distribution line), the rate of increase in the output pressure is lowered with respect to the rate of increase in the input pressure. Thus, after the pressures in the front and rear wheel brake cylinders 22, 26 has been raised to a predetermined critical point, the rate of increase of the pressure in the rear wheel brake cylinder 26 is lowered with respect to that of the pressure in the front wheel brake cylinder 22, in order to prevent otherwise possible locking of the rear wheel RL due to reduction of the load acting on the rear wheel RL which arises from a transfer of the vehicle load in the forward direction during braking of the vehicle.

A return passage 48 is connected at one end thereof to a portion of the rear brake cylinder passage 24 between the P valve 46 and the second shut-off valve device 32, and at the other end to a portion of the front brake cylinder passage 20 between the master cylinder 10 and the first shut-off valve device 30. A check valve 50 is provided in this return passage 48. This check valve 50 inhibits a flow of the fluid in a direction from the master cylinder 10 toward the rear wheel brake cylinder 26, and permits a flow of the fluid in the reverse direction. The check valve 50 is provided to prevent a residual pressure in the rear wheel brake cylinder 26 which would arise from the provision of a first check valve 54 of a pressure reducing device 52 which will be described.

The pressure reducing device 52 is disposed in a portion of the rear brake cylinder passage 24 between the point of connection to the pump passage 40 and the point of connection to the front brake cylinder passage 20. This pressure reducing device 52 includes the above-indicated first check valve 54 whose opening pressure difference is not substantially zero, and a second check valve 56 whose opening pressure difference is substantially zero. The first and second check valves 54, 56 are disposed in parallel with each other and have opposite directions in which the brake fluid is permitted to flow.

There will be described flows of the brake fluid to and from the master cylinder 10, pump 42, and front and rear wheel brake cylinders 22, 26.

In a normal braking pressure control operation of the present anti-lock braking system upon depression of the brake pedal 14 without an operation of the pump 42, the brake fluid pressurized by the master cylinder 10 is supplied to the front wheel brake cylinder 22 through the normally-open first solenoid-operated shut-off valve device 30, and to the rear wheel brake cylinder 26 through the first shut-off valve device 30 and the second check valve 56 of the pressure reducing device 52. Since the opening pressure difference of the second check valve 56 is substantially zero, almost the same braking pressures are applied to the front and rear wheel brake cylinders 22, 26.

In an anti-lock braking pressure control operation of the braking system, the pump 42 is operated with the first shut-off valve device 30 held in the closed state. The fluid delivered from the pump 42 is supplied to the front wheel brake cylinder 22 through the first check valve 54, and to the rear wheel brake cylinder 26 (to the P valve 46). Since the opening pressure difference of the first check valve 54 is not zero, the pressure of the fluid to be supplied to the front wheel brake cylinder 22 is made lower than that of the fluid to be supplied to the rear wheel brake cylinder 26, by an amount corresponding to the opening pressure difference of the first check valve 54. Thus, the front-rear distribution of the braking pressures of the front and rear wheel brake cylinders 22, 26 is optimized in the anti-lock braking pressure control operation, permitting in a rapid increase in the braking pressure of the rear wheel brake cylinder 26, namely, a rapid increase in the braking force of the rear wheel brake cylinder 26, and thereby resulting in reduction in the required braking distance of the motor vehicle, before the braking pressure or force reaches the bent point of the front-rear distribution line of the P valve 46, that is, even when a relatively light brake is applied to the vehicle.

Figure 2:
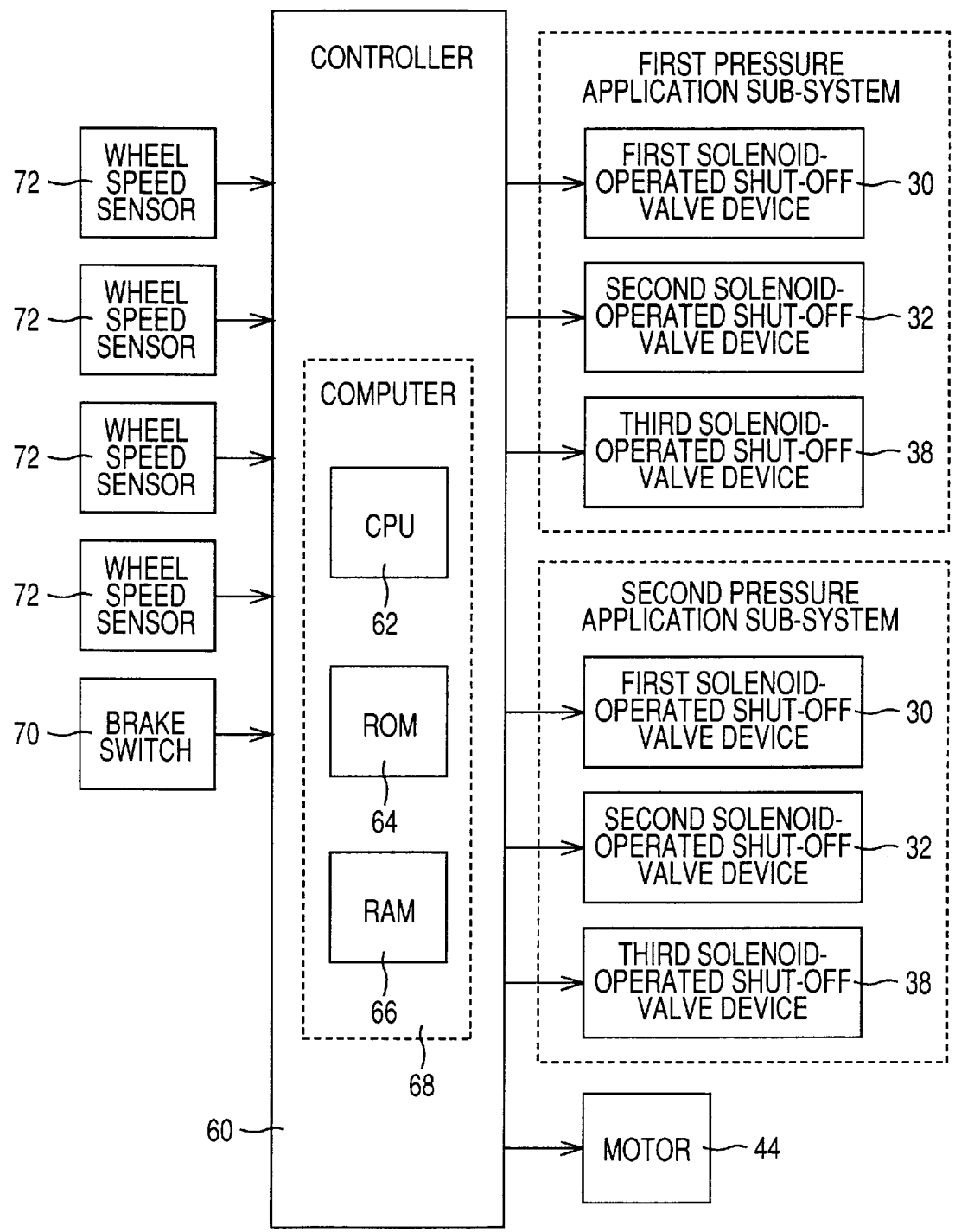
FIG. 2 is a block diagram showing an electric control system for the braking system of FIG. 1.

There will next be described an electrical control arrangement of the present braking system, by reference to the block diagram of FIG. 2.

The first, second and third solenoid-operated shut-off valve devices 30, 32, 38 are controlled by a controller 60, which is constituted principally by a computer 68 incorporating a processor in the form of a central processing unit (CPU) 62, a read-only memory (ROM) 64, and a random-access memory (RAM) 66. The ROM 64 stores various control programs for controlling the braking system in an anti-lock fashion, and the CPU 62 operates to execute these programs while utilizing a temporary data storage function of the RAM 66.

To effect the anti-lock braking pressure control for each of the front and rear wheel brake cylinders 22, 26 so as to prevent locking of the corresponding wheel (prevent an excessive amount of slip of the wheel), the controller 60 is adapted to receive the output signal of a brake switch 70 indicating whether the brake pedal 14 is operated by the vehicle operator, and the output signals of wheel speed sensors 72 indicative of the rotating speeds (peripheral speeds) of the wheels FR, FR, RL, RR. On the basis of the output signals of the brake switch 70 and wheel speed sensors 72, the controller 60 controls brake actuators in the form of the first, second and third solenoid-operated shut-off valve devices 30, 32, 38 of each of the first and second pressure-application sub-systems, and also controls the motor 44 for the pump 42.

Figure 3:
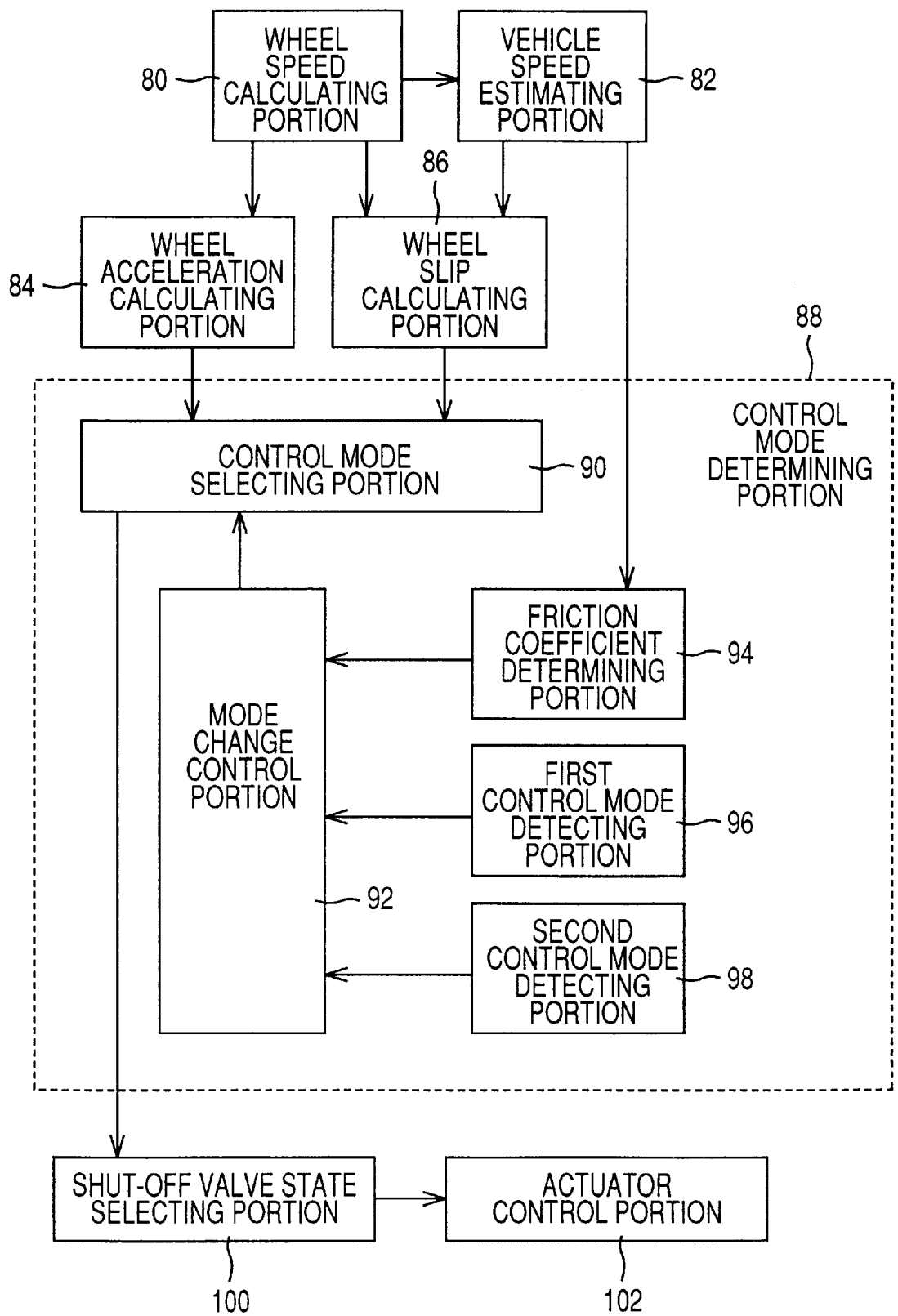
FIG. 3 is a block diagram showing an arrangement of a controller 60 used in the control system of FIG. 2.

Referring next to the functional block diagram of FIG. 3, various functional portions of the controller 60 will be described.

The controller 60 includes a wheel speed calculating portion 80, a vehicle speed estimating portion 82, a wheel acceleration calculating portion 84, a wheel slip calculating portion 86, a control mode determining portion 88, a solenoid valve state selecting portion 100 and an actuator control portion 102. The wheel speed calculating portion 80 is adapted to calculate the rotating speed of each wheel, on the basis of the output signals of the wheel speed sensors 72. The wheel speed calculating portion 80 is connected to the vehicle speed estimating portion 82, the wheel acceleration calculating portion 84 and the wheel slip calculating portion 86. The vehicle speed estimating portion 82 is adapted to estimate the running speed of the motor vehicle on the basis of the rotating speeds of the four wheels, and the wheel acceleration calculating portion 84 is adapted to calculate the acceleration value of each wheel on the basis of the rotating speed of the wheel which is calculated by the wheel speed calculating portion 80 at a predetermined time interval. Namely, the acceleration value of the wheel is obtained as a difference of two wheel speed values successively calculated by the calculating portion 80. The wheel slip calculating portion 86, which is also connected to the vehicle speed estimating portion 82, is adapted to calculate an amount of slip of each wheel by subtracting the vehicle running speed estimated by the vehicle speed estimating portion 82, from the rotating speed of the wheel calculated by the wheel speed calculating portion 80.

The vehicle speed estimating portion 82, the wheel acceleration calculating portion 84 and the wheel slip calculating portion 86 are connected to the control mode determining portion 88.

The control mode determining portion 88 includes a control mode selecting portion 90 for selecting one of different pressure control modes, a mode change control portion 92, a friction coefficient determining portion 94, a first control mode detecting portion 96 and a second control mode detecting portion 98. The control mode determining portion 88 serves as control mode determining means for finally determining the pressure control mode for each of the wheels.

The control mode selecting portion 90, which functions as normal control mode selecting means, is adapted to select an appropriate one of three pressure control modes for each of the front right and left wheels FR, FL and rear right and left wheels RR, RL. The three pressure control mode consist of a PRESSURE INCREASE mode for increasing the braking pressure in the wheel brake cylinder in question, a PRESSURE HOLD mode for holding the presently established braking pressure in the wheel brake cylinder, and a PRESSURE DECREASE mode. To this end, the control mode selecting portion 90 determines, on the basis of the calculated wheel acceleration values and the calculated amount of slip of the wheels, whether each wheel has a slipping or locking tendency, whether the amount of slip of the wheel has an increasing tendency, whether the slipping or locking tendency of the wheel is going to be eliminated, whether the wheel speed is changing to approach a level which is different from the vehicle speed by an optimum amount of slip of the wheel, and whether the wheel speed has excessively approached the vehicle speed. The control mode selecting portion 90 selects one of the pressure control modes, on the basis of affirmative or negative decisions obtained in the above-indicated determinations.

The PRESSURE INCREASE mode consists of a master cylinder increase sub-mode and a pump increase sub-mode. In the master cylinder increase sub-mode (rapid pressure increase mode), the braking pressure in the wheel brake cylinder 22, 26 is relatively rapidly increased by the pressure generated by the master cylinder 10 with the first shut-off valve device 30 held open. In the pump increase sub-mode (slow pressure increase mode), the braking pressure in the wheel brake cylinder 22, 26 is relatively slowly increased by the pressure of the fluid delivered from the pump 42 with the first shut-off valve device 30 held closed. That is, the pressure in the wheel brake cylinder 22 is increased at a lower rate in the pump increase sub-mode than in the master cylinder increase sub-mode.

The mode change control portion 92 of the control mode determining portion 88 is adapted to change the pressure control mode for each of the rear right and left wheels, as needed, on the basis of the friction coefficient μ of the road surface, and the pressure control modes which are currently selected by the control mode selecting portion 90 for the rear wheel under examination and the other rear wheel. Where the determination by the mode change control portion 92 as to whether the pressure control mode should be changed is made for the rear right wheel RR, the rear wheel under examination is the rear right wheel RR, while the other rear wheel is the rear left wheel RL. For the mode change control portion 92 to determine whether the pressure control mode for the rear wheel under examination should be changed, the mode change control portion 92 is connected to the friction coefficient determining portion 94 and the first and second control mode detecting portions 96, 98.

It will be understood that the control mode selecting portion 90, mode change control portion 92, friction coefficient determining portion 94 and first and second control mode detecting portions 96, 98 cooperate to constitute control mode changing means.

The friction coefficient determining portion 94 is adapted to determine the friction efficient μ of the road surface on which the vehicle is running. This determination is effected on the basis of the vehicle deceleration value which is obtained by differentiating the vehicle running speed estimated by the vehicle speed estimating portion 82. The first control mode detecting portion 96 is adapted to detect the pressure control mode which is currently selected by the control mode selecting portion 90, for the rear wheel (rear right or left wheel) under examination. Similarly, the second control mode detecting portion 98 is adapted to determine the pressure control mode currently selected for the other rear wheel.

An operation of the mode change control portion 92 of the controller 60 will be explained by reference to FIGS. 4 and 5.

The mode change control portion 92 is arranged so that only if the pressure control modes currently selected normally by the control mode selecting portion 90 for the rear right and left wheels are different from each other and if one of these selected pressure control modes is the PRESSURE DECREASE mode, the other pressure control mode is changed to the PRESSURE DECREASE mode, which is used as the effective control mode. That is, if the pressure control mode normally selected for the rear wheel under examination is the PRESSURE HOLD mode or PRESSURE INCREASE mode while the pressure control mode normally selected for the other rear wheel is the PRESSURE DECREASE mode, the control mode for the rear wheel under examination is changed to the PRESSURE DECREASE mode, which is established by the effective control mode. If the control mode normally selected for the other rear wheel is the PRESSURE HOLD mode or PRESSURE INCREASE mode, the control mode for the rear wheel under examination remains unchanged, and the normally selected control mode is used as the effective control mode.

Figure 4:
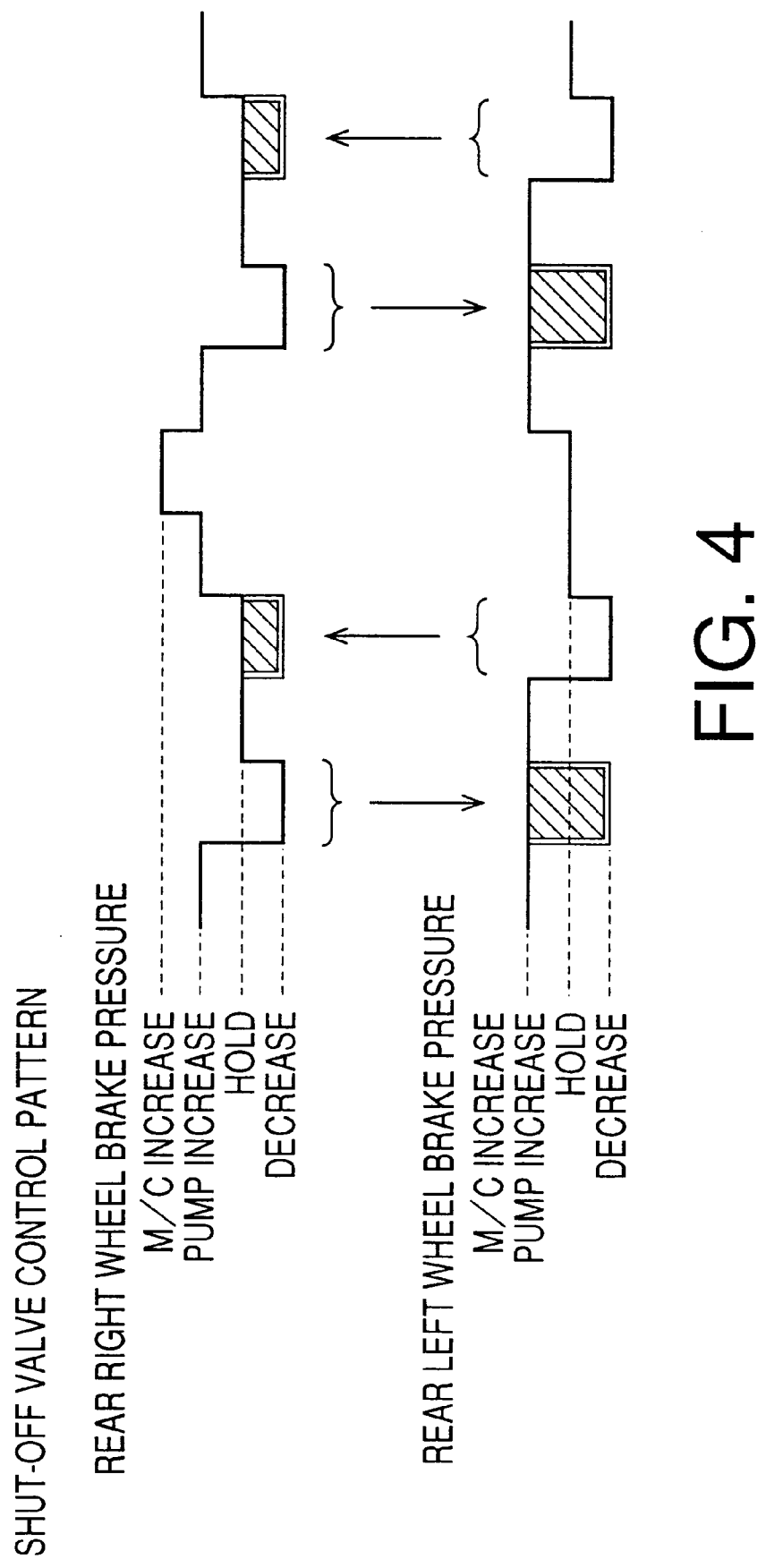

A single solid line in the upper graph of FIG. 4 shows an example of a change (as a function of time) in the pressure control mode normally selected for the rear right wheel RR, while a single solid line in the lower graph of FIG. 4 shows an example of a change (as a function of time) in the pressure control mode normally selected for the rear left wheel RL. The mode change control portion 92 is adapted to change the braking pressure control mode for one of the two rear wheels to the PRESSURE DECREASE mode only where the normally selected control modes for the two rear wheels are different from each other while the control mode selected for the other rear wheel is the PRESSURE DECREASE mode, as indicated by double solid lines in the graphs.

The operation of the mode change control portion 92 to change the pressure control mode for the rear wheels as described above provides the following advantages:

For controlling the braking pressures for the rear wheels (for the rear wheel brake cylinders), there are known "Independent Control" and "Select Low Control". In the "Independent Control", the pressure control modes are selected for the rear right and left wheels, independently of each other, and the braking pressures for the rear wheels are controlled in the thus selected control modes, independently of each other, as indicated in the uppermost part of the leftmost column of FIG. 5. That is, the control mode established for one of the rear wheels is not influenced by the control mode selected for the other rear wheel. In the "Select Low Control", where the control modes selected for the two rear wheels differ from each other and one of these control modes is the PRESSURE DECREASE mode, the other control mode is changed to the PRESSURE DECREASE mode, whereby the braking pressures of the two rear wheels are both controlled in the PRESSURE DECREASE mode, as indicated in the uppermost part of the rightmost column in FIG. 5. FIG. 5 show the waveforms of the control signals for controlling the shut-off valve devices 30, 32, 38, and the waveforms of the braking pressures of the rear wheel brake cylinders 26. In the specific example of FIG. 5, the vehicle is running on a road surface whose right and left parts have relatively high and low friction coefficient values, respectively, namely, the rear right wheel RR is running on a road surface area having a relatively high friction coefficient, while the rear left wheel RL is running on a road surface area having a relatively low friction coefficient.

The control mode determining portion 88, more specifically, the mode change control portion 92 is adapted to effect a Non-independent Control in the form of a Modified "Select Low Control" for controlling the braking pressures for the rear right and left wheels. The Modified "Select Low Control", which is indicated in the intermediate column of FIG. 5, is intermediate between the "Independent Control" and the pure "Select Low Control" described above. There will be described the advantages of the Modified "Select Low Control" by the mode change control portion 92 over the "Independent Control" and the pure "Select Low Control".

Figure 5:
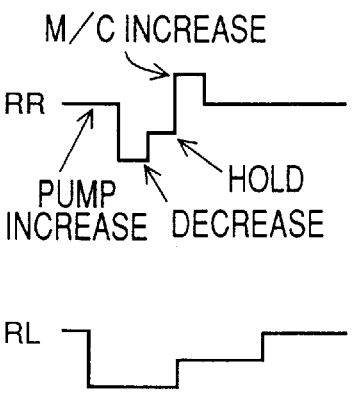
FIG. 5 is a view for explaining a modified "Select Low" control of rear wheel brake cylinder pressures by the controller 60, as compared with an independent control and a normal "Select Low" control of the rear wheel brake cylinder pressures.

According to the "Independent Control", the braking pressure for the rear right wheel RR is controlled to be higher than those according to the Modified "Select Low Control" and the pure "Select Low Control", as indicated in the second row of FIG. 5, whereby the largest braking force is advantageous obtained, as indicated in the lowermost row of FIG. 5. However, the "Independent Control" tends to suffer from a relatively large amount of slip of the rear right wheel RR, which results in a decrease in the maximum lateral force which may act on the rear right wheel RR, leading to deteriorated running stability of the vehicle during an anti-lock braking pressure control operation, as indicated in the third row of FIG. 5.

According to the pure "Select Low Control", the braking pressure for the rear right wheel RR is controlled to be lower than those according to the "Independent Control" and the Modified "Select Low Control", whereby the vehicle running stability is favorably improved. However, the pure "Low Select" Control suffers from an insufficient braking force.

According to the Modified "Select Low Control" according to the principle of the present invention, the braking pressure for the rear right wheel RR is controlled to be lower than that according to the "Independent Control" and higher than that according to the pure "Select Low Control". Accordingly, the present Modified "Select Low Control" does not suffer from excessive reduction in the vehicle running stability or the braking force, and assure satisfactory levels of the vehicle running stability and braking force.

In the present embodiment, the braking pressure for the rear wheel is necessarily lowered when the braking pressure for the front wheel is lowered. In this sense, the present braking system is adapted such that the braking pressure for the rear wheel is generally lower and the rear braking force is generally smaller than in a braking system in which the braking pressures for the front and rear wheels are controlled completely independently of each other. If the pure "Select Low Control" were adopted in the present braking system whose mechanical arrangement is shown in FIG. 1, the braking forces for the rear wheels would be excessively reduced or sacrificed for improvement of the vehicle running stability during braking. In the light of the characteristics of the "Independent Control" and pure "Select Low" control and the provision of the pressure reducing device 52, the mode change control portion 92 is adapted to control the rear braking pressures according to the Modified "Select Low Control", as indicated in the intermediate column of FIG. 5, which is a modification of the pure "Select Low Control" in an effort to assure a satisfactory compromise between the vehicle running stability and the rear braking forces.

The control mode determining portion 88 including the mode change control portion 92 described above is connected to the solenoid valve state selecting portion 100, which is adapted to select the operating states of the first, second and third solenoid-operated shut-off valve devices 30, 32, 38, on the basis of the pressure control modes selected for the individual wheels by the control mode selecting portion 90.

The ROM 64 of the computer 68 of the controller 60 stores data representative of a relationship as indicated in the table of FIG. 6, between the control modes of the front right and rear left wheels FR, RL and combinations of the operating states (open or closed state) of the first, second and third shut-off valve devices 30, 32, 38. In the table of FIG. 6, "M/C INCREASE" and "PUMP INCREASE" means respectively the master cylinder increase sub-mode and the pump increase sub-mode, each of which is considered the PRESSURE INCREASE mode. Further, marks "o" and "x" in the table represent respectively the open and closed states of the shut-off valve devices 30, 32, 38.

When the braking pressure for the front right wheel FR is controlled in the master cylinder increase sub-mode (rapid pressure increase mode), the first shut-off valve device 30 is placed in the open state irrespective of the pressure control mode selected for the rear left wheel RL. In this case, the second and third shut-off valve devices 32, 38 are placed in either the open state or the closed state, depending upon the control mode selected for the rear left wheel RL. Described in detail, the second and third shut-off valves devices 32, 38 are placed in the open and closed states, respectively, when the master cylinder increase sub-mode is selected for the rear left wheel FL, and are both placed in the closed states when the PRESSURE HOLD mode is selected for the rear left wheel RL. The shut-off valves devices 32, 38 are placed in the closed and open states, respectively, when the PRESSURE DECREASE mode is selected for the rear left wheel RL. When the master cylinder increase sub-mode is selected for both of the front right and rear left wheels FR, RL, the braking system is in the normal braking pressure control operation (not in the anti-lock braking pressure control operation).

When the pump increase sub-mode is selected for the front right wheel FR, the first shut-off valve device 30 is placed in the closed state, irrespective of the control mode selected for the rear left wheel RL. When the PRESSURE HOLD mode is selected for the rear left wheel RL in this condition, the second and third shut-off valve devices 32, 38 are also placed in the closed state. When the PRESSURE DECREASE mode is selected for the rear left wheel RL, the second shut-off valve device 32 is placed in the closed state while the third shut-off valve device 38 is placed in the open state.

When the PRESSURE HOLD mode is selected for the front right wheel FR while the pump increase sub-mode is selected for the rear left wheel RL, the first, second and third shut-off vales 30, 32, 38 are placed in the closed, open and closed states, respectively.

When the PRESSURE DECREASE mode is selected for both of the front right and rear left wheels FR, RL, the first, second and third shut-off valve devices 30, 32, 38 are placed in the closed, open and open states, respectively.

While the table of FIG. 6 shows a condition in which all of the shut-off valve devices 30, 32, 38 are placed in the open states, this condition is established during an anti-lock braking pressure control operation, for filling the empty reservoir 36 with the brake fluid received from the master cylinder 10, to permit the braking pressure to be increased by the pump 42 in the pump increase sub-mode.

According to the relationship as shown in FIG. 6, the solenoid valve state selecting portion 100 selects the open or closed state of each of the first, second and third shut-off valve devices 30, 32, 38 so as to establish the pressure control modes for the front right and rear left wheels FR, RL.

The solenoid valve state selecting portion 100 is connected to the actuator control portion 102, which applies the appropriate control signals to the shut-off valve devices 30, 32, 38, on the basis of the output signals of the solenoid valve state selecting portion 100.

Figure 7:
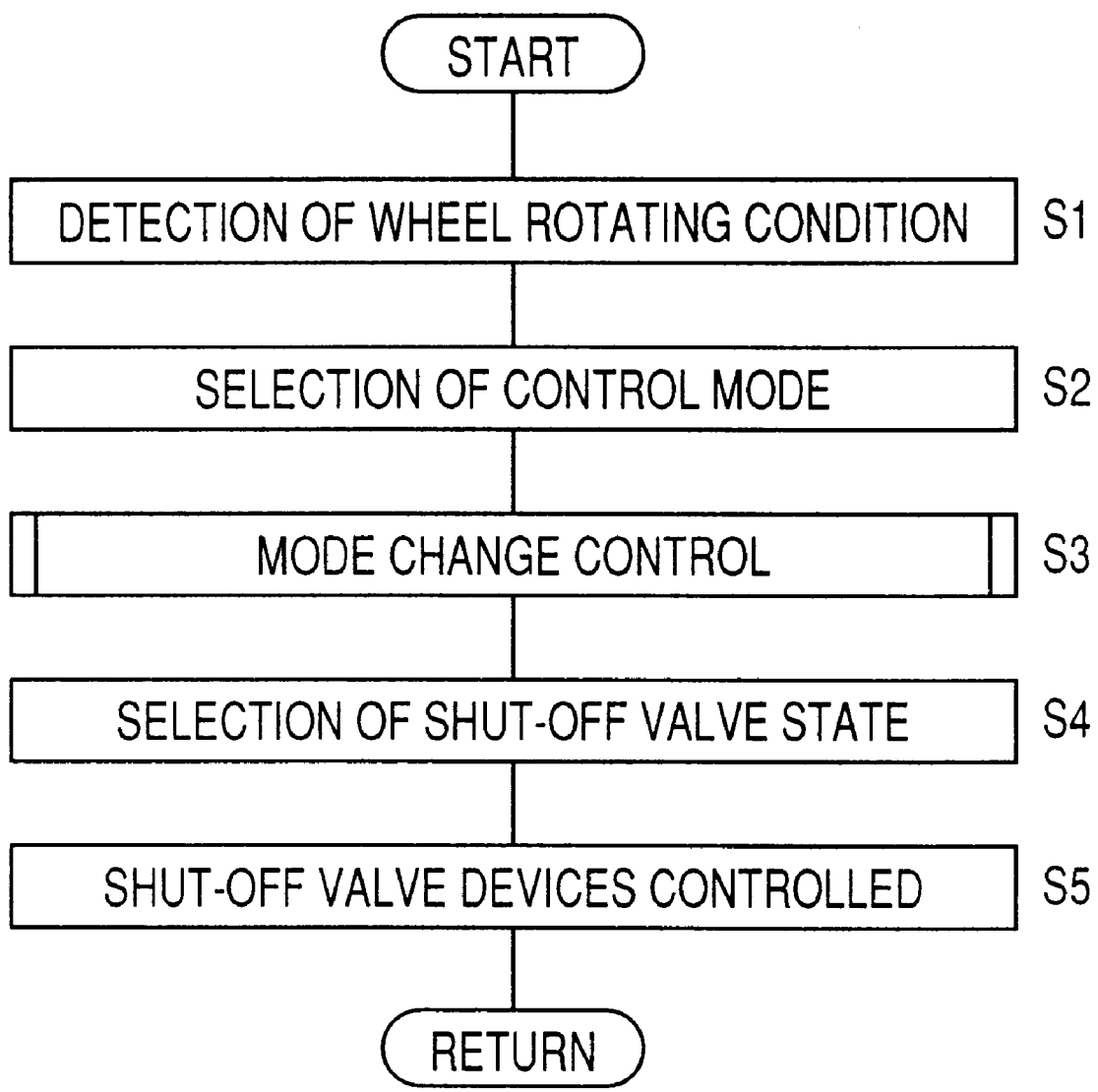
FIG. 7 is a flow chart illustrating an anti-lock braking pressure control routine stored in the ROM 64 of the controller 60.

While the operation of the controller 60 has been briefly described above, the controller 60 is adapted to execute an anti-lock braking pressure control routine illustrated in the flow chart of FIG. 7, for controlling the braking pressures in the wheel brake cylinders in the present braking system, according to an appropriate control program stored in the ROM 64.

The routine of FIG. 7 is executed with a predetermined cycle time, sequentially for the four wheels. The routine is initiated with step S1 to detect the acceleration value and amount of slip of the wheel under examination, as the rotating condition of that wheel. Step S1 is followed by step S2 to select the pressure control mode for the wheel under examination, on the basis of the detected rotating condition of the wheel. Step S2 is followed by step S3 to determine whether the pressure control mode selected in step S2 should be changed or not, and to change the control mode if necessary. In this respect, it is noted that the pressure control mode selected in step S2 is considered a normal pressure control mode. In step S3, the normal pressure control mode is either finally determined as an effective control mode, or replaced by another pressure control mode which is determined as the effective control mode.

Figure 8:
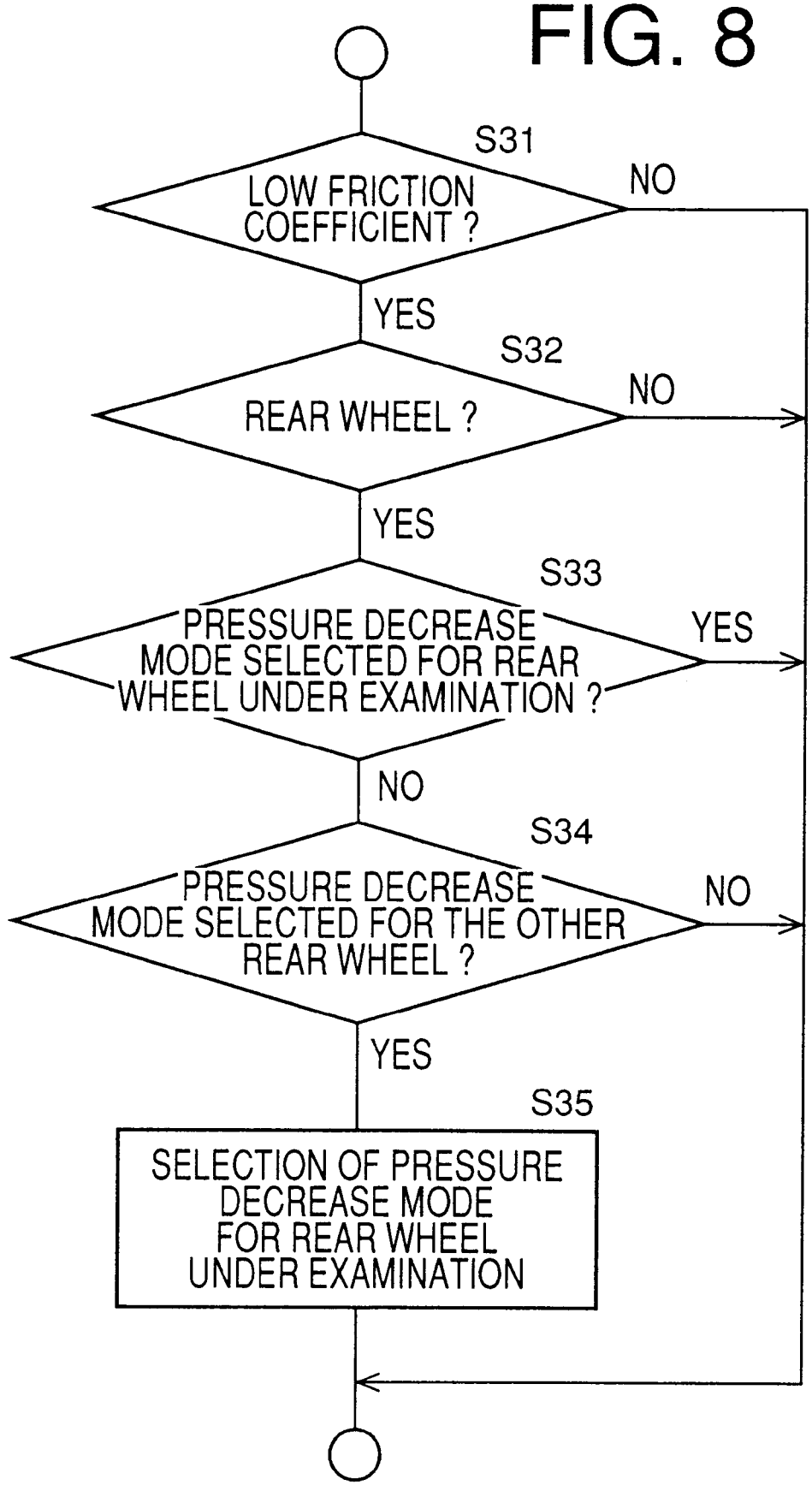
FIG. 8 is a flow chart illustrating a sub-routine executed in step S3 of the routine of FIG. 7.

Step S3 is a sub-routine illustrated in the flow chart of FIG. 8. This sub-routine is initiated with step S31 to determine whether the friction coefficient $\mu$ of the road surface on which the vehicle is running is lower than a predetermined threshold. To this end, the vehicle running speed estimated by the vehicle speed estimating portion 82 is differentiated to obtain a time derivative of the vehicle running speed. This time derivative is used as the vehicle deceleration value. The above determination on the friction coefficient is effected by determining whether the vehicle deceleration value is smaller than a predetermined threshold. If the vehicle deceleration value is smaller than the threshold, the friction coefficient $\mu$ of the road surface is determined to be lower than the threshold. The friction coefficient $\mu$ lower than the threshold means that the road surface is frozen or covered by compressed snow. If a negative decision (NO) is obtained in step S31, step S3 is terminated, and the control flow goes to step S4 of the routine of FIG. 7. Thus, the present embodiment is adapted such that the normal pressure control mode once determined for one of the rear wheels may be changed, only when the vehicle is braked during running on a road surface whose friction coefficient is comparatively low. In other words, the Modified "Select Low Control" explained above is available only when the friction coefficient $\mu$ of the road surface is comparatively low. When the vehicle is braked on a road surface whose friction coefficient $\mu$ is comparatively high, the braking pressures for the rear wheels are controlled independently of each other according to the "Independent Control" also explained above, for the purpose of reducing the required braking distance of the vehicle with relatively large braking forces applied to the rear wheels.

If the friction coefficient $\mu$ of the road surface is lower than the threshold, that is, if an affirmative decision (YES) is obtained in step S31, the control flow goes to step S32 to determine whether the wheel under examination is one of the rear right and left wheels RR, RL. If a negative decision (NO) is obtained in step S32, the control flow goes to step S4 of the routine of FIG. 7. Thus, the Modified "Select Low Control" is available only for the rear wheels.

If the wheel under examination is one of the rear wheels, that is, if an affirmative decision (YES) is obtained in step S32, the control flow goes to step S33 to determine whether the normal pressure control mode which has been selected in step S2 for the wheel under examination is the PRESSURE DECREASE mode. Since the Modified "Select Low Control" according to the present invention is to change the pressure control mode normally selected for the rear wheel under examination to the PRESSURE DECREASE mode in the following steps S34 and S35 (described below) if the PRESSURE DECEASE mode is selected for the other rear wheel, the implementation of the steps S34 and S35 is unnecessary and time-consuming if the PRESSURE DECREASE mode is currently selected for the rear wheel under examination. In this case, therefore, that is, if an affirmative decision (YES) is obtained in step S33, the sub-routine of FIG. 8 is terminated, and the control flow goes back to the routine of FIG. 8.

If the PRESSURE DECREASE mode is not currently selected for the rear wheel under examination, that is, if a negative decision (NO) is obtained in step S33, the control flow goes to step S34 to determine whether the PRESSURE DECREASE mode is selected as the normal control mode for the other rear wheel. According to the Modified "Select Low Control", the normal pressure control mode currently selected for the rear wheel under examination is not changed to the PRESSURE DECREASE mode if the pressure control mode currently selected for the other rear wheel is not the PRESSURE DECREASE mode, even when the control mode other than the PRESSURE DECREASE mode is selected for the rear wheel under examination, that is, even when the negative decision (NO) is obtained in step S33. Therefore, the sub-routine of FIG. 8 is terminated, and the control flow goes back to the routine of FIG. 7, if a negative decision (NO) is obtained in step S34, that is, if the PRESSURE DECREASE mode is not currently selected for the other rear wheel.

If an affirmative decision (YES) is obtained in step S34 with the PRESSURE DECREASE mode selected for the other rear wheel, the control flow goes to step S35 in which the pressure control mode (other than the PRESSURE INCREASE mode) normally selected in step S2 for the rear wheel under examination is changed to the PRESSURE DECREASE mode. That is, the PRESSURE DECREASE mode is finally determined as the effective control mode for the rear wheel under examination. The sub-routine of FIG. 8 is terminated with step S35.

Step S3 (sub-routine of FIG. 7) is followed by step S4 in which the operating states of the first, second and third shut-off valve devices 30, 32, 38 are selected according to the predetermined relationship of FIG. 6, depending upon the pressure control modes which have been determined in step S2 or S4 as the effective control modes. Thus, the combination of the operating states of the shut-off valve devices 30, 32, 38 for establishing the effective control modes for the front and rear wheels (e.g., FR and RL) in each of the first and second pressure application sub-systems is selected.

Step S4 is followed by step S5 in which the shut-off valve devices 30, 32, 38 are energized or deenergized to be placed in the selected operating states (open or closed states), in order to establish the effective pressure control modes. Thus, one cycle of execution of the routine of FIG. 7 is completed.

It will be understood from the above explanation that a portion of the computer 68 assigned to implement step S1 of FIG. 7 provides the wheel speed calculating portion 80, vehicle speed estimating portion 82, vehicle acceleration calculating portion 84 and wheel slip calculating portion 86, and that a portion of the computer 68 assigned to implement step S2 of FIG. 7 provides the control mode selecting portion 90. It will also be understood that a portion of the computer 68 assigned to implement step S3 of FIG. 7 provides the mode change control portion 92, friction coefficient determining portion 94 and first and second control mode detecting portions 96, 98. In this connection, portions of the computer 68 assigned to implement steps S31, S33 and S34 of FIG. 8 provides the friction coefficient determining portion 94, first control mode detecting portion 96 and second control mode detecting portion 98, respectively.

It will also be understood that portions of the computer 68 assigned to implement steps S4 and S5 of FIG. 7 provide the solenoid valve state selecting portion 100 and the actuator control portion 102, respectively.

In the present braking system, the Modified "Select Low Control" is employed in view of its basic arrangement wherein upon decrease of the braking pressures for the front wheels, the braking pressures for the rear wheels are also decreased. The Modified "Select Low Control" is effected during braking of the vehicle on a road surface whose friction coefficient μ is relatively low, so as to assure a satisfactory level of the vehicle running stability while minimizing reduction in the braking forces for the rear wheels. During braking of the vehicle on a road surface whose friction coefficient is relatively high, the "Independent Control" is effected to control the front and rear braking pressures independently of each other, so as to easily maximize the rear braking forces.

It will further be understood from the foregoing description of the present embodiment that the portions of the controller 60 assigned to implement steps S1–S3 of FIG. 7 constitute the control mode determining means for determining the effective control mode for each of the wheels, and that the portion of the controller 60 assigned to implement steps S4 and S5 of FIG. 7 constitute solenoid valve device control means for controlling the solenoid-operated shut-off valve devices 30, 32, 38 to establish the effective pressure control modes. It will be further understood that the portions of the controller 60 assigned to implement steps S1 and S2 constitute the normal control mode selecting means, while the portion of the controller 60 assigned to implement step S3 constitutes the control mode changing means for changing the control mode selected by the normal control mode selecting means, under the predetermined condition described above in detail by reference to FIG. 8. It is noted that the portion of the controller 60 assigned to implement the sub-routine of FIG. 8 constitutes an example of the control mode changing means.

In the anti-lock braking system according to the first embodiment of FIG. 1 which has been described above, the braking pressure in the rear wheel brake cylinder of each pressure application sub-system is necessarily lowered when the braking pressure in the front wheel brake cylinder is lowered. However, the principle of the present invention is equally applicable to an anti-lock braking system of some other types in which the braking pressures in the individual wheel brake cylinders are controllable independently of each other. For instance, the present invention is applicable to an anti-lock braking system in which a decrease in the front wheel brake cylinder will not cause a decrease in the rear wheel brake cylinder. An example of this type of braking system will be described by reference to FIG. 9.

This braking system has two pressure application sub-systems, namely, a front pressure application sub-system and a rear pressure application sub-system. The rear pressure application sub-system includes a brake cylinder 144 for braking a rear left wheel RL and a brake cylinder 146 for braking a rear right wheel RR, while the front pressure application sub-system includes a brake cylinder for braking a front left wheel and a brake cylinder for braking a front right wheel. Since the front and rear pressure application sub-systems are identical in construction with each other, only the rear pressure application sub-system is illustrated in FIG. 9 and will be described by way of example.

Figure 9:
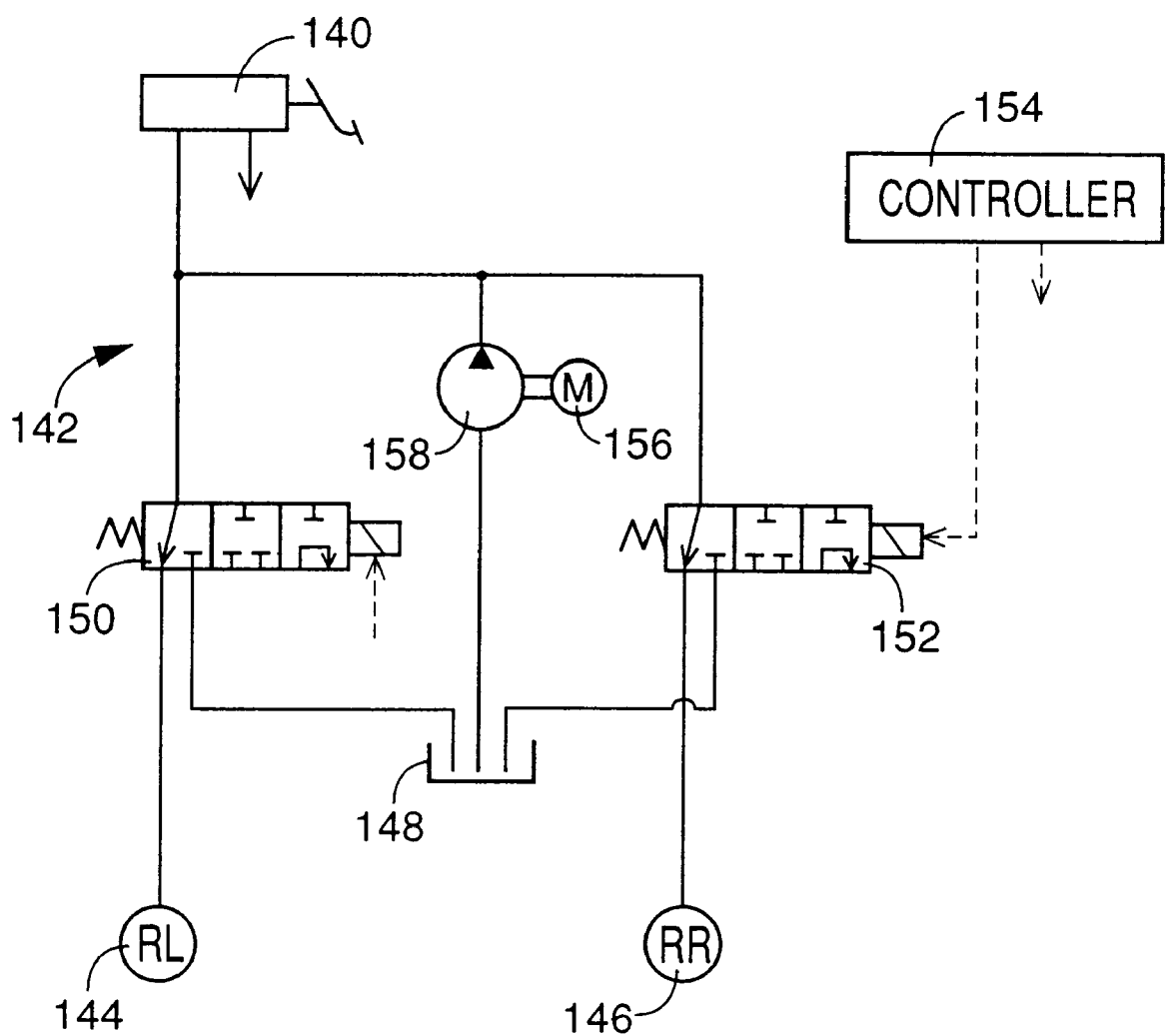
FIG. 9 is a schematic view showing an anti-lock braking system having a front pressure application sub-system for front wheels and a rear pressure application sub-system for rear wheels, which system is constructed according to another embodiment of this invention.

In the rear pressure application sub-system of FIG. 9, one of the two pressurizing chambers of a tandem type master cylinder 140 is connected through a fluid passage 142 to the brake cylinder 144 of the rear left wheel RL and the brake cylinder 146 of the rear right wheel RR. In portions of the fluid passage 142 between the master cylinder 140 and the rear wheel brake cylinders 144, 146, there are disposed two solenoid-operated directional control valve devices 150, 152, respectively. Each of these valve devices 150, 152 has a pressure increase position, a pressure hold position and a pressure decrease position. In the pressure increase position, the valve device 150, 152 is disconnected from a reservoir 148 and is connected to the master cylinder 140. In the pressure hold position, the valve device 150, 152 is disconnected from both the master cylinder 140 and the reservoir 148. In the pressure decrease position, the valve device 150, 152 is disconnected from the master cylinder 140 and is connected to the reservoir 148. The solenoid-operated valve devices 150, 152 are controlled by a controller 154. The fluid which has been discharged from the wheel brake cylinders 144, 146 into the reservoir 148 is pumped up by a pump 158 driven by a motor 156, and thus the pressurized fluid is delivered to the portions of the fluid passage 142 between the master cylinder 140 and the directional control valve devices 150, 152. In the rear pressure application sub-system of FIG. 9, the braking pressures in the rear left and right wheel brake cylinders 144, 146 can be controlled independently of each other. Further, the present braking system including the front and rear pressure application sub-systems, the braking pressures in the front and rear wheel brake cylinders can be controlled independently of each other.

While the two presently preferred embodiments of this invention have been described above for illustrative purpose only, it is to be understood that the present invention is not limited to the details of the illustrated embodiments, and may be otherwise embodied.

For instance, step S35 of the sub-routine of FIG. 8 (step S3 of the routine of FIG. 7) may be modified so that the pressure control mode of the rear wheel under examination is changed to the PRESSURE HOLD mode rather than the PRESSURE DECREASE mode, if the normal pressure control mode normally selected for the rear wheel under examination is the PRESSURE INCREASE mode.

It will be understood that the present invention may be embodied with various other changes, modifications and improvements, which may occur to those skilled in the art, without departing from the spirit and scope of the invention defined in the following claims:

What is claimed is:

1. An anti-lock braking system of diagonal type of a motor vehicle having front right and left wheels and rear right and left wheels, said braking system having two pressure application sub-systems connected to respective two mutually independent pressurizing chambers of a master cylinder, one of said two sub-systems including a front right wheel brake cylinder for braking said front right wheel and a rear left wheel brake cylinder for braking said rear left wheel, while the other of said two sub-systems including a front left wheel brake cylinder for braking said front left wheel and a rear right wheel brake cylinder for braking said rear right wheel, each of said two sub-systems further including a reservoir, a pump connected to said reservoir, and at least one solenoid-operated valve device, said braking system including a controller for controlling said at least one solenoid-operated valve device and said pump of said each sub-system, to control braking pressures in said front and rear wheel brake cylinders in an anti-lock fashion so as to prevent an excessive amount of slip of the front and rear wheels, said each sub-system being constructed such that the braking pressure in said rear wheel brake cylinder is reduced upon reduction of a braking pressure in said front wheel brake cylinder, wherein said controller comprises:

(a) control mode determining means for determining, as an effective control mode, for each of said rear right and left wheel brake cylinders of said two pressure application sub-systems, one of a plurality of pressure control modes including a pressure decrease mode, a pressure hold mode and a pressure increase mode in which the braking pressure in said each rear wheel brake cylinder is reduced, held constant and increased, respectively, said control mode determining means determining the effective control modes for said rear wheel brake cylinders in a non-independent control manner such that if the pressure control modes which are selected for said rear wheel brake cylinders in an independent control manner independently of each other are different from each other and include said pressure decrease mode, said pressure decrease mode selected in said independent control manner for one of said rear wheel brake cylinders is determined as the effective control mode for said one of said rear wheel brake cylinders, while one of said plurality of pressure control modes which is other than the pressure control mode selected in said independent control manner for the other of said rear wheel brake cylinders is determined as the effective control mode for said other of said rear wheel brake cylinders, said one of said plurality of pressure control modes which is determined as said effective control mode for said other of said rear wheel brake cylinders causing the braking pressure in said other of said rear wheel brake cylinders to be lower than when the pressure control mode selected in said independent control manner for said other of said rear wheel brake cylinders is determined as the effective control mode, said control mode determining means determining said pressure control modes selected in said independent control manner for said rear wheel brake cylinders, as said effective control modes for said rear right and left wheel brake cylinders, respectively, if said pressure control modes selected in said independent control manner are different from each other and consist of said pressure hold mode selected for one of said rear wheel brake cylinders and said pressure increase mode selected for the other of said rear wheel brake cylinders; and (b) solenoid valve device control means for controlling said at least one solenoid-operated valve device to establish said effective control modes determined by said control mode determining means for said rear right and left wheel brake cylinders.

2. An anti-lock braking system according to claim 1, wherein said each of said two pressure application sub-systems further includes a front brake cylinder passage connecting a corresponding one of said two pressurizing chambers of said master cylinder and said front wheel brake cylinder, a rear brake cylinder passage which is connected at one end thereof to said front brake cylinder passage and at the other end to said rear wheel brake cylinder, a first solenoid-operated valve device disposed in a portion of said front brake cylinder passage between said master cylinder and a point of connection between said front and rear brakes cylinder passages, a second solenoid-operated valve device disposed in said rear brake cylinder passage, a reservoir passage which is connected at one end thereof to a portion of said rear brake cylinder passage between said second solenoid-operated valve device and said rear wheel brake cylinder and at the other end to said reservoir, a third solenoid-operated valve device disposed in said reservoir passage, and a pump passage which is connected at one end thereof to said reservoir and at the other end to one of said front brake cylinder passage and a portion of said rear brake cylinder passage between said second solenoid-operated valve device and said point of connection, said at least one solenoid-operated valve device including said first, second and third solenoid-operated valve devices.

3. An anti-lock braking system according to claim 1, wherein said control mode determining means determines said pressure decrease mode as the effective control mode for said other of said rear wheel brake cylinders if said pressure control modes which are selected in said independent control manner for said rear wheel brake cylinders independently of each other include said pressure decrease mode selected for said one of said rear wheel brake cylinders.

4. An anti-lock braking system according to claim 1, wherein said control mode determining means determines, as said effective mode for said other of said rear wheel brake cylinders, said one of said plurality of pressure control modes which is other than the pressure control mode selected in said independent control manner for said other rear wheel brake cylinder and which causes the braking pressure in said other rear wheel brake cylinder to be lower than when the pressure control mode selected in said independent control mode for said other rear wheel brake cylinder is determined as said effective control mode, if said pressure control modes which are selected in said independent control manner for said rear wheel brake cylinders independently of each other are different from each other and include said pressure decrease mode and if a friction coefficient of a road surface on which the motor vehicle is running is lower than a predetermined threshold, said control mode determining means determining, as said effective mode for said other rear wheel brake cylinder, the pressure control mode selected in said independent control if said pressure control modes which are selected in said independent control manner for said rear wheel brake cylinders consist of said pressure hold mode for said one rear wheel brake cylinder and the pressure increase mode for said other rear wheel brake cylinder, or if said friction coefficient of said road surface is not lower than said threshold.

5. An anti-lock braking system according to claim 1, wherein said control mode determining means comprises:

normal control mode selecting means operable in said independent control manner, for selecting normal control modes from said plurality of pressure control modes, for said rear wheel brake cylinders, respectively, independently of each other; and control mode changing means operable in said non-independent control manner, for changing the normal control mode selected for said other of said rear wheel brake cylinder to one of said plurality of pressure control mode which is determined as said effective control mode for said other rear wheel brake cylinder and which causes the braking pressure to be lower than when said normal control mode selected for said other rear wheel brake cylinder is determined as said effective control mode for said other rear wheel brake cylinder, if said normal control modes selected for said rear wheel brake cylinders are different from each other and include said pressure decrease mode, and wherein said control mode changing means determines, as said effective control mode for said other of said rear wheel brake cylinders, the normal control mode selected for said other rear wheel brake cylinder, if said normal control modes selected for said rear wheel brake cylinders consist of said pressure hold mode selected as the normal control mode for said one of said rear wheel brake cylinder and said pressure increase mode selected as the normal control mode for said other rear wheel brake cylinder.

6. An anti-lock braking system according to claim 4, wherein said control mode determining means comprises:

normal control mode selecting means operable in said independent control manner, for selecting normal control modes from said plurality of pressure control modes, for said rear wheel brake cylinders, respectively, independently of each other; and control mode changing means operable in said non-independent control manner, for changing the normal control mode selected for said other of said rear wheel brake cylinder to one of said plurality of pressure control mode which is determined as said effective control mode for said other rear wheel brake cylinder and which causes the braking pressure to be lower than when said normal control mode selected for said other rear wheel brake cylinder is determined as said effective control mode for said other rear wheel brake cylinder, if said normal control modes selected for said rear wheel brake cylinders are different from each other and include said pressure decrease mode, and if said friction coefficient of said road surface is lower than said predetermined threshold, and wherein said control mode changing means determines, as said effective control mode for said other of said rear wheel brake cylinders, the normal control mode selected for said other rear wheel brake cylinder, if said normal control modes selected for said rear wheel brake cylinders consist of said pressure hold mode selected as the normal control mode for said one of said rear wheel brake cylinder and said pressure increase mode selected as the normal control mode for said other rear wheel brake cylinder, or if said friction coefficient of said road surface is not lower than said threshold.

7. An anti-lock braking system of a motor vehicle having front right and left wheels and rear right and left wheels, said braking system having a rear right wheel brake cylinder for braking said rear right wheel, a rear left wheel brake cylinder for braking said rear left wheel, at least one solenoid-operated valve device, and a controller, for controlling said at least one solenoid-operated valve device, to control braking pressures in said rear right and left wheel brake cylinders, in an anti-lock fashion so as to prevent an excessive amount of slip of the rear wheels, wherein said controller comprises:

(a) Control mode determining means for determining, as an effective control mode, for each of said rear right and left wheel brake cylinders of said two pressure application sub-systems, one of a plurality of pressure control modes including a pressure decrease mode, a pressure hold mode and a pressure increase mode in which the braking pressure in said each rear wheel brake cylinder is reduced, held constant and increased, respectively, said control mode determining means determining the effective control modes for said rear wheel brake cylinders in a non-independent control manner such that if the pressure control modes which are selected for said rear wheel brake cylinders in an independent control manner independently of each other are different from each other and include said pressure decrease mode, said pressure decrease mode selected in said independent control manner for one of said rear wheel brake cylinders is determined as the effective control mode for said one of said rear wheel brake cylinders, while one of said plurality of pressure control modes which is other than the pressure control mode selected in said independent control manner for the other of said rear wheel brake cylinders is determined as the effective control mode for said other of said rear wheel brake cylinders, said one of said plurality of pressure control modes which is determined as said effective control mode for said other of said rear wheel brake cylinders causing the braking pressure in said other of said rear wheel brake cylinders to be lower than when the pressure control mode selected in said independent control manner for said other of said rear wheel brake cylinders is determined as the effective control mode, said control mode determining means determining said pressure control modes selected in said independent control manner for said rear wheel brake cylinders, as said effective control modes for said rear right and left wheel brake cylinders, respectively, if said pressure control modes selected in said independent control manner are different from each other and consist of said pressure hold mode selected for one of said rear wheel brake cylinders and said pressure increase mode selected for the other of said rear wheel brake cylinders; and (b) solenoid valve device control means for controlling said at least one solenoid-operated valve device to establish said effective control modes determined by said control mode determining means for said rear right and left wheel brake cylinders.

8. An anti-lock braking system according to claim 7, wherein said control mode determining means determines said effective control modes for said rear right and left wheel brake cylinders such that while the braking pressure in one of said rear right and left wheel brake cylinders is reduced, the braking pressure in the other of said rear right and left wheel brake cylinders is also reduced, such that while the braking pressure in said one of said rear right and left wheel brake cylinders is increased, the braking pressure in said other of said rear right and left wheel brake cylinders is not necessarily increased, and such that while the braking pressure in said one of said rear right and left wheel brake cylinders is held constant, the braking pressure in said other of said rear right and left wheel brake cylinders is not necessarily held constant.

9. An anti-lock braking system of a motor vehicle having front right and left wheels and rear right and left wheels, said braking system having a rear right wheel brake cylinder for braking said rear right wheel, a rear left wheel brake cylinder for braking said rear left wheel, at least one solenoid-operated valve device, and a controller for controlling said at least one solenoid-operated valve device, to control braking pressures in said rear right and left wheel brake cylinders, in an anti-lock fashion so as to prevent an excessive amount of slip of the rear wheels, wherein said controller controls said at least one solenoid-operated valve device to control the braking pressures in said rear right and left wheel brake cylinders such that while the braking pressure in one of said rear right and left wheel brake cylinders is reduced, the braking pressure in the other of said rear right and left wheel brake cylinders is also reduced, such that while the braking pressure in said one of said rear right and left wheel brake cylinders is increased, the braking pressure in said other of said rear right and left wheel brake cylinders is not necessarily increased, and such that while the braking pressure in said one of said rear right and left wheel brake cylinders is held constant, the braking pressure in said other of said rear right and left wheel brake cylinders is not necessarily held constant.

* * * * *